US012484083B2

(12) United States Patent
Kang et al.

(10) Patent No.: US 12,484,083 B2
(45) Date of Patent: Nov. 25, 2025

(54) DEVICE, METHOD, AND COMPUTER READABLE STORAGE MEDIUM FOR TRANSMITTING AND RECEIVING INFORMATION FOR COMMUNICATION IN UNLICENSED BAND

(71) Applicant: THINKWARE CORPORATION, Seongnam-si (KR)

(72) Inventors: Jeoungkyu Kang, Seongnam-si (KR); Daewon Kim, Seongnam-si (KR); Taekyu Han, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 472 days.

(21) Appl. No.: 17/894,475

(22) Filed: Aug. 24, 2022

(65) Prior Publication Data

US 2023/0071536 A1 Mar. 9, 2023

(30) Foreign Application Priority Data

Aug. 25, 2021 (KR) .......................... 10-2021-0112552

(51) Int. Cl.
*H04W 72/10* (2009.01)
*H04W 16/14* (2009.01)
*H04W 72/56* (2023.01)

(52) U.S. Cl.
CPC .......... *H04W 72/56* (2023.01); *H04W 16/14* (2013.01)

(58) Field of Classification Search
CPC ....... H04W 4/40; H04W 72/56; H04W 72/40; H04W 16/14
See application file for complete search history.

(56) References Cited

U.S. PATENT DOCUMENTS

| 11,272,560 B1* | 3/2022 | Vivanco | ................. H04W 28/20 |
| 2021/0007002 A1 | 1/2021 | Kang et al. | |
| 2021/0105790 A1* | 4/2021 | Lin | ........................ H04W 72/56 |

(Continued)

FOREIGN PATENT DOCUMENTS

| WO | 2020/198415 A1 | 10/2020 |
| WO | 2021/002736 A1 | 1/2021 |
| WO | 2021/067958 A1 | 4/2021 |

OTHER PUBLICATIONS

Extended European Search Report dated Mar. 20, 2023, issued in European patent application No. 22192005.1 (14 pages).

(Continued)

*Primary Examiner* — Syed Ali
(74) *Attorney, Agent, or Firm* — WHDA, LLP

(57) ABSTRACT

According to various embodiments, a first user equipment (UE) includes a memory; a transceiver to transmit and receive a wireless signal; and a processor connected with the memory and the transceiver, wherein the processor is configured to determine to perform communication through a sidelink on unlicensed band with a second UE while the first UE is in a state which is out of coverage of a base station, based on the determination, identify pre-configuration information stored in the memory, obtain a priority threshold value for the sidelink on the unlicensed band from the pre-configuration information, and determine, based on the priority threshold value, whether to transmit data through the sidelink on the unlicensed band with the second UE.

12 Claims, 15 Drawing Sheets

(56) References Cited

U.S. PATENT DOCUMENTS

| | | | |
|---|---|---|---|
| 2021/0160728 A1* | 5/2021 | Jung | H04L 5/0064 |
| 2021/0289412 A1* | 9/2021 | Zhang | H04W 48/18 |
| 2021/0400732 A1* | 12/2021 | Xue | H04W 76/14 |
| 2022/0216947 A1 | 7/2022 | Kim | |
| 2023/0020019 A1* | 1/2023 | Bhowmik | H04R 25/554 |
| 2023/0057351 A1* | 2/2023 | Ye | H04W 52/367 |
| 2023/0059550 A1* | 2/2023 | Yao | H04L 1/1854 |
| 2023/0070113 A1* | 3/2023 | Kang | H04W 76/14 |
| 2024/0147200 A1* | 5/2024 | Yu | H04W 4/38 |
| 2024/0205811 A1* | 6/2024 | Wang | H04W 48/16 |
| 2025/0106876 A1* | 3/2025 | Hayashi | H04W 72/20 |

OTHER PUBLICATIONS

Vivo, "Remaining issue on SL/UL prioritization", 3GPP Draft; R2-2007872, 3rd Generation Partnership Project (3GPP), Mobile Competence Center; 650, Route Des Lucioles; F-06921 Sophia-Antipolis Cedex; France, vol. RAN WG2, No. E-Meeting; Aug. 7, 2020 (6 pages).

* cited by examiner

DEVICE, METHOD, AND COMPUTER READABLE STORAGE MEDIUM FOR TRANSMITTING AND RECEIVING INFORMATION FOR COMMUNICATION IN UNLICENSED BAND

CROSS-REFERENCE TO RELATED APPLICATIONS

This application is based on and claims priority under 35 U.S.C. § 119 to Korean Patent Application No. 10-2021-0112552, filed on Aug. 25, 2021, in the Korean Intellectual Property Office, the disclosure of which is incorporated by reference herein in its entirety.

BACKGROUND

Technical Field

The following descriptions relate to a device, a method, and a computer readable storage medium for transmitting and receiving information for communication in an unlicensed band.

Description of Related Art

After the first generation mobile communication, in which only voice signals are transmitted and received in the past, mobile communication has evolved to the present fifth generation (hereinafter referred to as 5G) mobile communication. The 5G mobile communication technology has been developed with the goal of enhanced mobile broadband (eMBB), ultra-reliable & low latency communication (URLLC), and machine-type communications (mMTC).

Currently, development for system network improvement is in progress based on advanced small cell, cloud radio access network (RAN), ultra-dense network, device-to-device (D2D) communication, wireless backhaul, mobile network, cooperative communication, coordinated multi-point (CoMP) transmission and reception, interference mitigation and cancellation, and the like.

5G mobile communication technology is a new radio access technology (RAT) and is referred to NR (new radio). NR may support vehicle to everything (V2X) communication (i.e., C(Cellular)-V2X communication).

V2X is a communication technology that exchanges information between pedestrians, objects, and vehicles through wired/wireless communication. V2X may be divided into various types. Specifically, V2X may be divided into types of vehicle to vehicle (V2V), vehicle to infrastructure (V2I), vehicle to network (V2N), and vehicle to pedestrian (V2P). V2V refers to communication between a vehicle and a vehicle, V2I refers to communication between a vehicle and an infrastructure, V2N refers to communication between a vehicle and a network, and V2P refers to communication between a vehicle and a pedestrian.

SUMMARY

For C (Cellular)-V2X communication, discussion for the integrity (or URLLC) of the communication connection is currently in progress, but the procedure for securing the amount of transmitted data (or the amount of received data) is not defined. Accordingly, a method for securing the amount of data may be required.

The spectrum for C-V2X communication (i.e., licensed band) and unlicensed band are set separately, and most of the signal exchange during C-V2X communication take place in the licensed band, but an error in communication and a sharp drop in reliability may occur due to an external obstacle or the like. C-V2X communication is basically communication between a vehicle and an object, and reliability and low latency of a signal may be essentially required.

The need to use an unlicensed band in C-V2X communication may be required. When the user equipment is located outside the coverage of the base station, the user equipment must allocate resources for performing C-V2X communication with other user equipment. When the user equipment is located within the coverage of the base station, resources may be allocated from the base station, but when the user equipment is located outside the coverage of the base station, resources may not be allocated from the base station.

Accordingly, when the user equipment is located outside the coverage of the base station, various information needs to be pre-configured to perform C-V2X communication (or sidelink communication) through the unlicensed band.

The technical problems to be achieved in this document are not limited to those described above, and other technical problems not mentioned herein will be clearly understood by those having ordinary knowledge in the art to which the present disclosure belongs, from the following description.

According to various embodiments, a first user equipment (UE) may comprise a memory; a transceiver to transmit and receive a wireless signal; and a processor connected with the memory and the transceiver, wherein the processor may be configured to determine to perform communication through a sidelink on unlicensed band with a second UE while the first UE is in a state which is out of coverage of a base station, based on the determination, identify pre-configuration information stored in the memory, obtain a priority threshold value for the sidelink on the unlicensed band from the pre-configuration information, and determine, based on the priority threshold value, whether to transmit data through the sidelink on the unlicensed band with the second UE.

According to various embodiments, a first user equipment (UE) may comprise a memory; a transceiver to transmit and receive a wireless signal; and a processor connected with the memory and the transceiver, wherein the processor may be configured to identify pre-configuration information stored in the memory while the first UE is in a state which is out of coverage of a base station, identify a search frequency list and an anchor carrier on unlicensed band from the pre-configuration information, and establish, based on the search frequency list and the anchor carrier on the unlicensed band, sidelink connection on the unlicensed band with a second UE.

According to various embodiments, a method for operating a first user equipment (UE) may comprise determining to perform communication through a sidelink on unlicensed band with a second UE while the first UE is in a state which is out of coverage of a base station, based on the determination, identifying pre-configuration information stored in the memory, obtaining a priority threshold value for the sidelink on the unlicensed band from the pre-configuration information, and determining, based on the priority threshold value, whether to transmit data through the sidelink on the unlicensed band with the second UE.

According to various embodiments, a method for operating a first user equipment (UE) in wireless communication system may comprise identifying pre-configuration information stored in the memory while the first UE is in a state which is out of coverage of a base station, identifying a search frequency list and an anchor carrier on unlicensed band from the pre-configuration information, and establishing, based on the search frequency list and the anchor carrier on the unlicensed band, sidelink connection on the unlicensed band with a second UE.

According to various embodiments, a computer readable storage medium may store one or more programs, wherein the one or more programs may comprise instructions which cause the first electronic device to determine to perform communication through a sidelink on unlicensed band with a second UE while the first UE is in a state which is out of coverage of a base station, based on the determination, identify pre-configuration information stored in the memory, obtain a priority threshold value for the sidelink on the unlicensed band from the pre-configuration information, and determine, based on the priority threshold value, whether to transmit data through the sidelink on the unlicensed band with the second UE.

The effects that can be obtained from the present disclosure are not limited to those described above, and any other effects not mentioned herein will be clearly understood by those having ordinary knowledge in the art to which the present disclosure belongs, from the following description.

DETAILED DESCRIPTION

Figure 1:
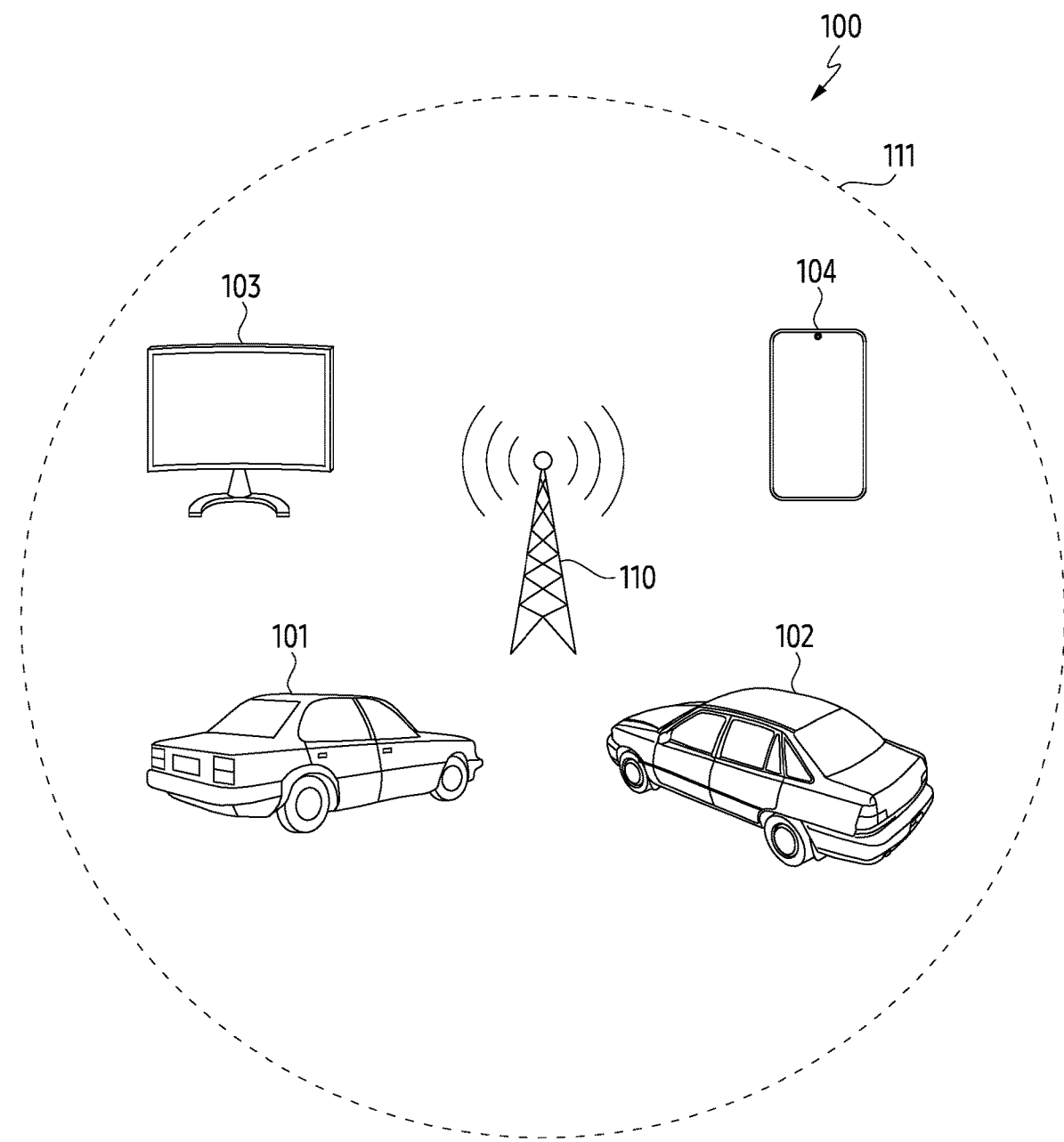
FIG. 1 illustrates a basic conceptual diagram of mobile communication.

According to various embodiments, an unlicensed band can be used for sidelink communication. Specifically, even when a user equipment is outside coverage of a base station, the user equipment can transmit data to another user equipment based on the pre-configuration information.

As various information is included in the pre-configuration information, the user equipment can transmit data by allocating (or selecting) resources by itself without being allocated resources from the base station.

In addition, the user equipment can identify a search frequency list and an anchor carrier based on the pre-configuration information. The user equipment can establish a sidelink connection with another user equipment based on the search frequency list and the anchor carrier.

Hereinafter, various embodiments of the present document will be described with reference to the accompanying drawings.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include anyone of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or portion thereof, adapted to perform one or more functions. For example, according to an embodiment, the module may be implemented in a form of an application-specific integrated circuit (ASIC).

FIG. 1 illustrates a basic conceptual diagram of mobile communication.

Referring to FIG. 1, a mobile communication system 100 may include a network for performing communication by an electronic device. The network may be configured in various ways. For example, the network may be configured as NR, long term evolution (LTE), LTE-advanced (LTE-A), or wireless LAN (e.g., Wi-Fi 802.11a/b/g/n/a/ax/be).

The electronic device may include vehicles 101 and 102, a TV 103, and a smartphone 104. The electronic device (e.g., the vehicle 101, the vehicle 102, the TV 103, and the smartphone 104) illustrated in FIG. 1 are exemplary, and the electronic device may include various devices.

For example, the electronic device may include a home appliance, a server, an Internet of Thing (JOT) device, a computer, a laptop, and the like. The electronic device may include a mobile equipment (ME) that integrates a universal subscriber identity module (USIM), a universal integrated circuit card (UICC), or an embedded UICC (eUICC).

The electronic device may be variously referred to according to the type of the network. The electronic device may be referred to as user equipment (hereinafter, UE), a mobile station, a subscriber station, a wireless terminal (or device), or the like.

The electronic device may be connected to the base station 110. The base station 110 may include various devices or nodes for wireless communication. For example, the base station 110 may include a transmit point (TP), transmit-receive point (TRP), enhanced base station (or eNB), a 5G base station (gNB), an access point (AP), and the like.

A coverage 111 may indicate a limit area in which a signal may be transmitted and received through the base station 110. The coverage 111 illustrated in FIG. 1 is illustrated in a circular shape, but is not limited thereto. The coverage 111 may be configured in various forms according to various situations. In addition, the coverage 111 does not mean only a two-dimensional area, but may be configured to a three-dimensional space (e.g., a hemisphere or a sphere).

The electronic device may transmit and receive a control message and user data through legacy communication and/or 5G communication. For example, the control message may include a message related to at least one of security control, bearer setup, authentication, registration, or mobility management of the electronic device. For example, the user data may mean user data excluding a control message transmitted and received between an electronic device and a core network (e.g., an Evolved Packet Core (EPC)).

The electronic device may perform communication through the base station 110, and the electronic devices may be directly connected to each other without passing through the base station.

For example, the vehicle 101 and the vehicle 102 may be directly connected to each other without passing through the base station 110. As an example, the vehicle 101 and the vehicle 102 may transmit and receive data through sidelink communication.

As another example, the TV 103 and the smartphone 104 may transmit and receive data to and from each other through various wireless communication (e.g., Bluetooth or Wi-Fi) without passing through the base station 110.

The mobile communication system 100 of FIG. 1 illustrates an example configured with one base station 110, but is not limited thereto. The mobile communication system 100 may include a plurality of base stations including the base station 110. Each of the plurality of base stations may be connected to a plurality of electronic devices, and the electronic devices connected to different base stations may communicate with each other.

According to an embodiment, the first electronic device connected to the first base station among a plurality of base stations may be out of the coverage of the first base station. The first electronic device may go out of the coverage of the first base station and enter the coverage of the second base station among the plurality of base stations. The first electronic device may perform a handover procedure for releasing a connection with a first base station and establishing a connection with a second base station. After the handover procedure is completed, the first electronic device may perform communication through the second base station.

Hereinafter, for convenience of description, the base station may be described as a base station (BS). In addition, the electronic device connected to the base station may be described as a user equipment (UE).

Figure 2:
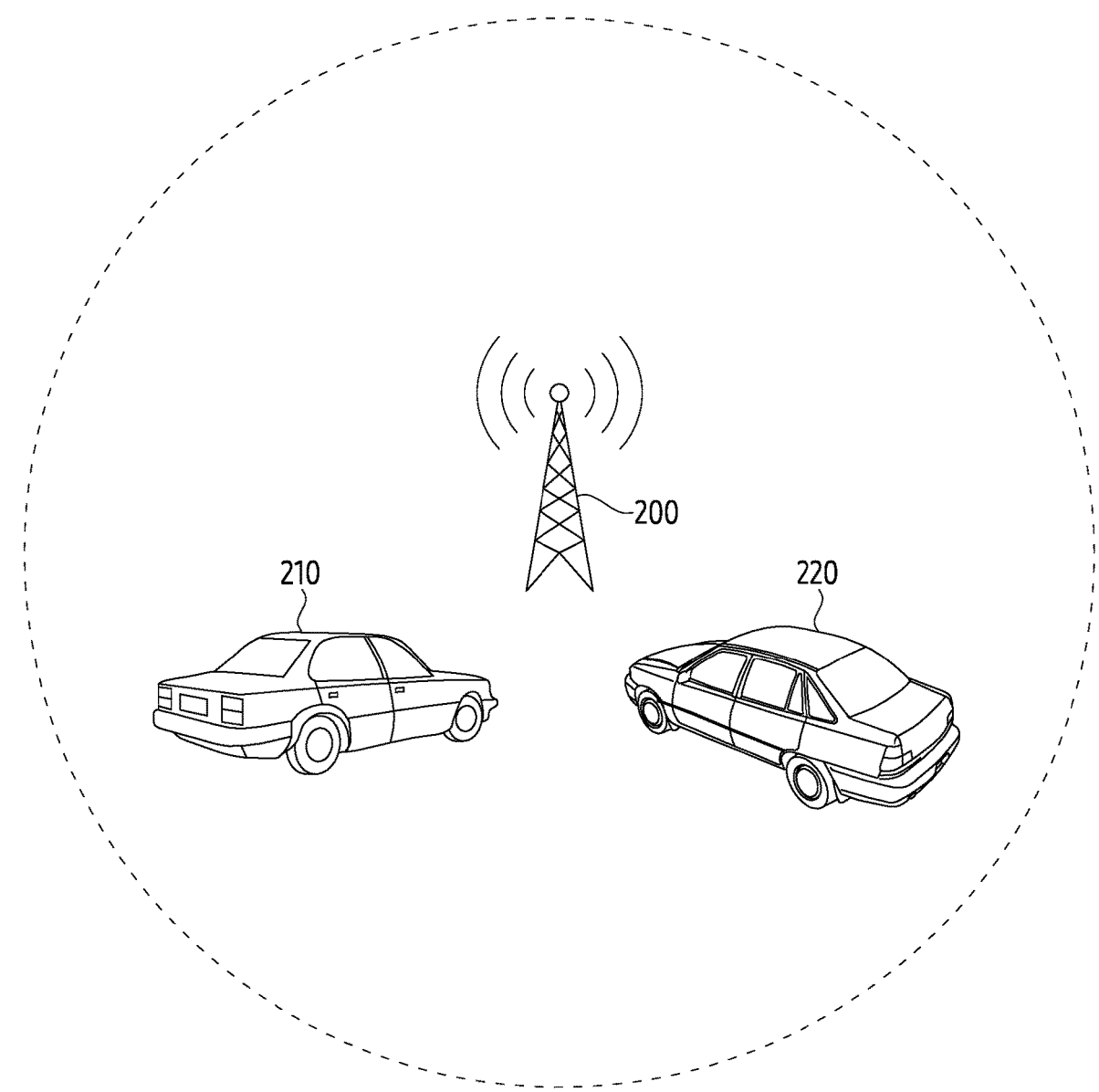
FIG. 2 is a diagram for describing an example of sidelink communication in NR.

FIG. 2 is a diagram for describing an example of sidelink communication in NR.

Referring to FIG. 2, the UE 1 210 and the UE 2 220 may directly perform sidelink communication without passing through the BS 200. The UE 1 210 and the UE 2 220 may be in a state connected to the BS 200. In other words, the UE 1 210 and the UE 2 220 may be located within the coverage of the BS 200.

According to an embodiment, the UE 1 210 and the UE 2 220 may receive information on a resource (or information on resource scheduling) to perform the sidelink communication from the BS 200. The UE 1 210 and the UE 2 220 may identify a resource to perform sidelink communication based on information on a resource to perform sidelink communication received from the BS 200. The UE 1 210 and the UE 2 220 may perform sidelink communication through the identified resource.

Specifically, the BS 200 may include information on a plurality of resources in a downlink control information (DCI) through a physical downlink control channel (PDCCH) and transmit the information. A detailed description of the DCI will be described later.

Figure 3:
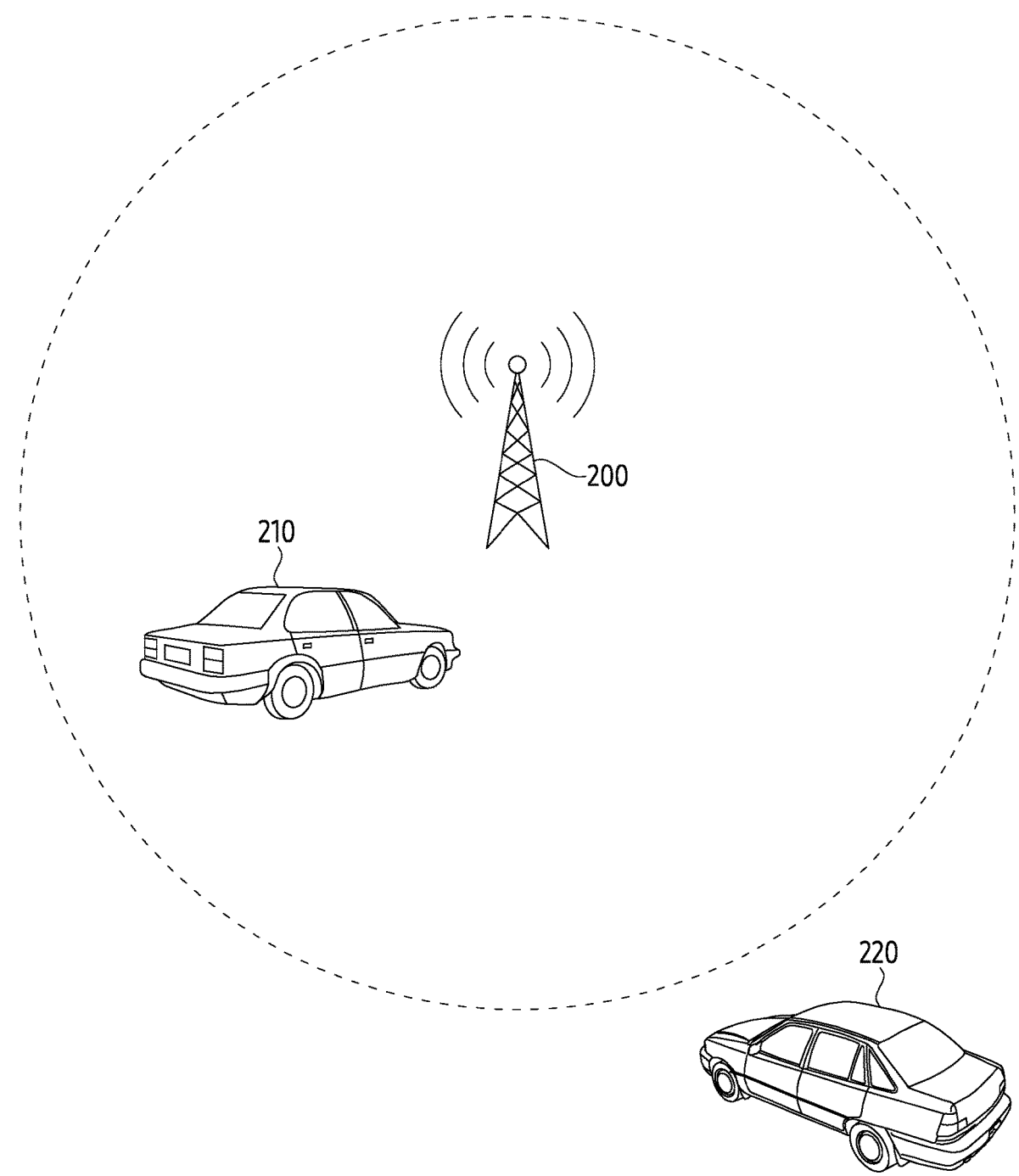
FIG. 3 is a diagram for describing another example of sidelink communication in NR.

FIG. 3 is a diagram for describing another example of sidelink communication in NR.

Referring to FIG. 3, unlike FIG. 2, only the UE 1 210 may be connected to the BS 200, and the UE 2 220 may not be connected to the BS 200.

According to an embodiment, only the UE 1 210 of the UE 1 210 and the UE 2 220 may receive information (or information on a resource pool) on a plurality of resources from the BS 200. The UE 1 210 may select a resource unit from among a plurality of resources and transmit a signal to the UE 2 220 through the selected resource. In addition, the UE 2 220 may identify a resource selected by the UE 1 210 and perform sidelink communication through the resource selected by the UE 1.

In FIG. 3, an embodiment of receiving information on a plurality of resources through the BS 200 when only the UE 1 210 is connected to the BS 200 and the UE 2 220 is not connected to the BS 200 has been described, but the above embodiment may be applied to the situation of FIG. 2.

Specifically, the UE 1 210 may perform sidelink communication by transmitting the SCI (sidelink control information) to the UE 2 220 through the PSCCH (physical sidelink shared channel) and transmitting data to the UE 2 220 through the PSSCH (physical sidelink shared channel) based on the SCI. A detailed description of the SCI will be described later.

Hereinafter, the DCI and the SCI may be described.

First, an example of a DCI format may be described. The DCI format may be configured as illustrated in Table 1 below.

TABLE 1

| DCI format | Usage |
| --- | --- |
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |

TABLE 1-continued

| DCI format | Usage |
|---|---|
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause 9.3.1 of [10, TS 38.473] |
| 2_6 | Notifying the power saving information outside DRX Active Time for one or more UEs |
| 3_0 | Scheduling of NR sidelink in one cell |
| 3_1 | Scheduling of LTE sidelink in one cell |

Referring to Table 1, the DCI format may include a DCI format 0, a DCI format 1, and a DCI format 2.

The DCI format 0 may include a DCI format 0_0, a DCI format 0_1 and a DCI format 0_2. The DCI format 0 may be used in uplinks.

The DCI format 0_0 may be used for scheduling the PUSCH in one cell (or uplink (UL) cell). The DCI format 0_1 may be used for scheduling one or more PUSCHs in one cell. The DCI format 0_1 may be used to indicate downlink feedback information (DFI) for configured grant PUSCH. The DCI format 0_0 and the DCI format 0_1 may be used for eMBB.

The DCI format 0_2 may be used for scheduling the PUSCH in one cell. The DCI format 0_2 may be used for URLLC.

Meanwhile, in the unlicensed band (or sharing spectrum), the DCI format 0 may include information different from the above-described information.

For example, the DCI formats 0_0 and 0_1 may include an indicator indicating a channel access type.

For example, in the unlicensed band, the DCI format 0_1 may include an indicator indicating whether it is downlink feedback indication (DFI) or uplink grant.

The DCI format 1 may include a DCI format 1_0, a DCI format 1_1 and a DCI format 1_2. The DCI format 1 may be used in downlink.

The DCI format 1_0 may be used for scheduling a PDSCH in one cell (or a downlink (DL) cell). The DCI format 1_1 may be used for scheduling the PDSCH in one cell. DCI format 1_1 may be used to trigger one shot HARQ (hybrid automatic repeat and request)-ACK (acknowledgement) codebook feedback. The DCI format 1_0 and the DCI format 1_1 may be used for eMBB.

The DCI format 1_2 may be used for scheduling the PDSCH in one cell. The DCI format 1_2 may be used for URLLC.

Meanwhile, in an unlicensed band (or sharing spectrum), the DCI format 1 may include information different from the above-described information. For example, the DCI formats 1_0 and 1_1 may include an indicator indicating a channel access type.

The DCI format 2 may include a DCI format 2_0, a DCI format 2_1, a DCI format 2_2, a DCI format 2_3, a DCI format 2_4, a DCI format 2_5, and a DCI format 2_6. The DCI format 2 may be used for special purposes.

The DCI format 2_0 may be used to inform a slot format, a channel occupancy time (COT) duration, a possible resource block (RB) sets, and a search space set group switching.

For example, the DCI format 2_0 may include a slot format indicator. The slot format indicator may indicate whether a symbol is DL, UL, or flexible in the corresponding slot.

Meanwhile, in the unlicensed band, the DCI format 2_0 may be used in the same format. However, information indicated by the DCI format 2_0 may be changed. For example, through DCI format 2_0, in which band the channel is occupied may be indicated for each resource. In other words, the DCI format 2_0 may include information indicating whether a corresponding channel is empty.

The DCI format 2_1 may be used to inform a physical resource block (PRB)(s) and OFDM symbol(s) that the UE assume will not transmit under its own intention. In other words, the DCI format 2_1 may include information for indicating not to listen to a signal in a corresponding slot.

The DCI format 2_2 may be used to transmit a transmit power control (TPC) command for PUCCH and PUSCH. In other words, the DCI format 2_2 may be used for uplink power control.

The DCI format 2_3 may be used to transmit a group of TPC commands for sounding reference signal (SRS) transmission by one or more UEs. In other words, the DCI format 2_3 may be used for uplink power control.

The DCI format 2_4 may be used to inform the PRB(s) and OFDM symbol(s) that cancel uplink transmission. In other words, the DCI format 2_4 may include an uplink cancellation indicator.

The DCI format 2_5 may be used to inform availability of soft resource. In other words, the DCI format 2_5 may include an indicator for IAB node support.

The DCI format 2_6 may be used to inform power saving information outside a DRX (Discontinuous Reception) active time for one or more UEs. In other words, the DCI format 2_6 may include a DRX activation indicator.

The DCI format 3 may include a DCI format 3_0 and a DCI format 3_1.

The DCI format 3_0 may be used for NR sidelinks in one cell.

The DCI format 3_1 may be used for a long-term evolution (LTE) sidelink in one cell.

Hereinafter, an example of an SCI format may be described.

The above-described DCI refers to control information transmitted by the BS to the UE through the PDCCH, but the SCI may refer to control information that the UE transmits to another UE through the PSCCH. The SCI may be transmitted in two steps, and a detailed operation related thereof may be described below.

The first UE may transmit the first SCI (e.g., 1st-stage SCI) to the second UE through the PSCCH. The first SCI may include information for scheduling the PSSCH. Thereafter, the first UE may transmit the second SCI.

The second SCI may be transmitted to the second UE through the PSSCH. The second UE may identify information for scheduling the PSSCH and decode the second SCI based on the first SCI. For example, the second SCI may be piggybacked together with data through the PSSCH and transmitted to the second UE.

Meanwhile, the first SCI transmitted through the PSCCH may be used to schedule the second SCI and the PSSCH. The first SCI may include SCI format 1-A.

Meanwhile, the second SCI transmitted through the PSSCH may be used to transmit sidelink scheduling information. The second SCI may include a SCI format 2-A and/or a SCI format 2-B. The SCI format 2-A and the SCI format 2-B may be used to decode the PSSCH.

Hereinafter, a frequency band used in NR may be described.

A frequency band (or frequency range) used in NR may be divided into a first type and a second type. The first type of frequency band may be referred to as FR (Frequency Range) 1. The second type of frequency band may be referred to as FR 2.

For example, the ranges of the first type frequency band and the second type frequency band may be configured as illustrated in Table 2.

TABLE 2

| Frequency Range designation | Corresponding frequency range | Subcarrier Spacing (SCS) |
| --- | --- | --- |
| FR 1 | 450 MHz-6000 MHz | 15, 30, 60 kHz |
| FR 2 | 24250 MHz-52600 MHz | 60, 120, 240 kHz |

Referring to Table 2, the FR 1 may be configured in a band of 450 MHz to 6000 MHz. The FR 2 may be configured in a band of 24250 MHz to 52600 MHz. The specific frequency values described in Table 2 are exemplary and may be changed.

Figure 4:
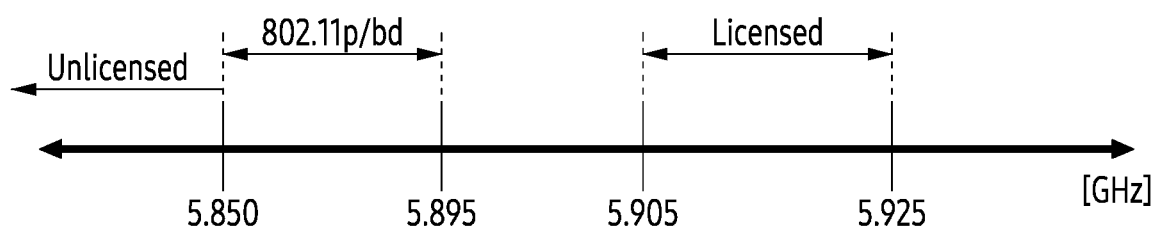
FIG. 4 illustrates a band of 5.9 GHz.

FIG. 4 illustrates a band of 5.9 GHz.

Referring to FIG. 4, the 5.9 GHz band may include an unlicensed band and a licensed band. The specific frequency range illustrated in FIG. 4 may be set differently for each country and may be changed.

For example, 20 MHz, from 5.905 GHz to 5.925 GHz, may be set as the licensed band and may be be used for V2X communication (or C-V2X communication). In addition to the licensed band of 20 MHz, 10 MHz from 5.895 GHz to 5.905 GHz may also be set as the licensed band.

For example, 45 MHz from 5.850 GHz to 5.895 GHz may be used for wireless Internet (e.g., 802.11p/bd).

A band equal to or less than 5.850 GHz or greater than 5.925 GHz may be set as the unlicensed band. The unlicensed band may be used for a various purposes, and for example, it may be used for communication for a vehicle (e.g., self-driving). The unlicensed band may be referred to as a sharing spectrum.

For the sidelink communication (e.g. C(Cellular)-V2X communication), discussion for the integrity (or URLLC) of the communication connection is currently in progress, but a procedure for securing the amount of transmitted data (or received data) is not defined, a method for securing it may be required.

According to various embodiments, a spectrum of a band for C-V2X communication and an unlicensed band are set separately, but the unlicensed band may be used to secure the amount of transmitted and received data in C-V2X communication.

Accordingly, in the following specification, various embodiments for using an unlicensed band in sidelink communication (e.g., C-V2X communication) may be described.

As illustrated in FIG. 4, since the licensed band and the unlicensed band operate separately, pre-parameters may be set or new parameters may be required to use the unlicensed band for sidelink communication (e.g., C-V2X communication).

In the following specification, an example of a pre-configuration parameter for sidelink communication (e.g., C-V2X communication) in the unlicensed band may be described. The pre-configuration parameter may be set in a USIM (or, Universal Integrated Circuit Card (UICC)) of a user equipment or may be reset from an entity of a core.

The following embodiments may be described through V2X communication, which is an example of sidelink communication, for convenience of description. The following embodiments may be applied not only to V2X communication but also to sidelink communication including the same.

In the following description, an example in which the first user equipment and the second user equipment operate a licensed band and an unlicensed band to transmit and receive data through sidelink communication will be described according to another embodiment.

For example, when performing sidelink communication, the first user equipment and the second user equipment may transmit and receive low-capacity data below the threshold through the licensed band, and large-capacity data above the threshold may be transmitted and received through the unlicensed band.

For example, when performing sidelink communication, the first user equipment and the second user equipment may transmit and receive data having high reliability through the licensed band, and may transmit and receive data having somewhat low reliability through the unlicensed band. In this case, the data having high reliability may include personal information on the user equipment user, login information, financial information, payment information, and the like.

For example, when performing sidelink communication, the first user equipment and the second user equipment may transmit and receive data requiring encryption through the licensed band, and may transmit and receive data not requiring encryption through the unlicensed band. In this case, the data requiring encryption may include personal information on the user equipment user, login information, financial information, payment information, and the like.

For example, when performing sidelink communication, the first user equipment and the second user equipment may transmit and receive data requiring urgency through the licensed band, and may transmit and receive data not requiring urgency through the unlicensed band. In this case, the data requiring urgency may include disaster information, emergency information, accident information, emergency braking information, and the like.

For example, when performing sidelink communication, the first user equipment and the second user equipment may transmit and receive data related to the software update notification of the vehicle through the licensed band, and may transmit and receive data for software update of the vehicle through the unlicensed band.

For example, when performing sidelink communication, the first user equipment and the second user equipment may transmit and receive data that attribute is mandatory through the licensed band, and transmit and receive data that attribute is optional through the unlicensed band.

For example, when performing sidelink communication, the first user equipment and the second user equipment may transmit and receive upload data through the licensed band, and may transmit and receive download data through the unlicensed band.

For example, when performing sidelink communication, the first user equipment and the second user equipment may transmit and receive a resource indicator indicating a resource for communication through a licensed band, and may transmit and receive data through resources included in the unlicensed band. Specifically, the first user equipment and the second user equipment may transmit and receive data through the resource of the unlicensed band indicated by the resource indicator transmitted and received through the licensed band.

For example, equipment when performing sidelink communication, the first user equipment and the second user equipment may transmit and receive control information for the first user equipment to control the second user through the license band, may transmit and receive ACK/NACK information or feedback information on the control information through the unlicensed band.

An example in which the above-described the first user equipment and the second user equipment operate the licensed band and the unlicensed band through sidelink communication is only an embodiment, and as the opposite case to the above-described example, the licensed band and the unlicensed band may be operated.

First, an embodiment for establishing V2X communication connection in the unlicensed band may be described, and then, an embodiment for allocating resources for V2X communication in the unlicensed band may be described.

An embodiment for establishing V2X communication connection in the unlicensed band According to various embodiments, in order to perform V2X communication in the unlicensed band, the first user equipment may establish V2X communication in the unlicensed band with the second user equipment.

According to an embodiment, the first user equipment may identify a designated search frequency list. The first user equipment may determine a frequency (or band) for performing V2X communication within a designated search frequency list. The first user equipment may establish V2X communication connection with the second user equipment through the determined frequency.

For example, the search frequency list information may be pre-configured in the first user equipment. For example, the search frequency list information may be pre-configured (or stored) in a universal integrated circuit card (UICC) included in the first user equipment. As another example, the search frequency list information may be reset from an entity of a core.

The pre-configured search frequency list information may be set as a field (or parameter) illustrated in Table 3.

TABLE 3

| Field | Description |
|---|---|
| Sl-PreconfigFreqInfoList | This field indicates the NR sidelink communication configuration some carrier frequency(ies). In this release, only one SL-FreqConfig can be configured in the list. |

Referring to Table 3, the search frequency list information may be set as a "Sl-PreconfigFreqInfoList" field (or parameter). The "Sl-PreconfigFreqInfoList" field may indicate a sidelink communication configuration of some carrier frequencies.

According to an embodiment, the first user equipment may identify a designated anchor carrier frequency list. For example, the first user equipment may identify the anchor carrier frequency list in addition to the search frequency list.

For example, the anchor carrier frequency list information may be pre-configured in the first user equipment. For example, the anchor carrier frequency list information may be pre-configured (or stored) in the UICC included in the first user equipment. As another example, the anchor carrier frequency list information may be reset from the entity of the core.

The pre-configured anchor carrier frequency list information may be set to a field (or parameter) illustrated in Table 4.

TABLE 4

| Field | Description |
|---|---|
| sl-PreconfigNR-AnchorCarrierFreqList | This field indicates the NR anchor carrier frequency list, which can provide the NR sidelink communication configuration. |

Referring to Table 4, the anchor carrier frequency list information may be set as a "sl-PreconfigNR-AnchorCarrierFreqList" field (or parameter). The "sl-PreconfigNR-AnchorCarrierFreqList" field may provide a sidelink communication configuration.

According to an embodiment, during V2X communication in the unlicensed band, subcarrier spacing may be set to one of 15, 30, 60, and 120 kHz. For V2X communication in the unlicensed band, a CP-OFDM waveform may be used, and at least one modulation of Q-PSK, 16-QAM, 64-QAM, or 256-QAM may be used.

An Embodiment for Resource Allocation in the Unlicensed Band

According to various embodiments, an embodiment for resource allocation for V2X communication of the unlicensed band may be largely divided into two. According to the first embodiment, a resource transmitted through the PSSCH may be scheduled by a base station. According to the second embodiment, a resource transmitted through the PSSCH may be autonomously configured by a sensing procedure of a user equipment.

First Embodiment—an Embodiment in which Resources are Allocated by the Base Station According to the first embodiment, the base station (hereinafter, BS) may allocate resources for V2X communication within the unlicensed band. In other words, the BS may allocate resources for sidelink communication to the RRC-connected user equipment (hereinafter, UE) through a dedicated scheduling scheme.

For example, the BS is a dynamic grant and may allocate resources for V2X communication within the unlicensed band. For another example, the BS is a semi-static grant, and may allocate resources for V2X communication within the unlicensed band through RRC signaling. Specifically, when the UE has data to be transmitted to another UE, the UE may inform the BS that there is data to be transmitted to the other UE through the RRC message (or a MAC control element (CE). For example, the RRC message may include a sidelink terminal information message or a terminal assistance information message. For example, the MAC control element may include a buffer status report (BSR) MAC CE or a scheduling report (SR).

For example, when a grant is configured by the BS, the grant may be used by a user equipment until the grant is released through the RRC signaling.

As another example, the BS may activate the grant by transmitting the DCI to the user equipment. The BS may also deactivate the grant by transmitting the DCI to the user equipment.

A specific example of the first embodiment may be described with reference to FIG. 5.

Figure 5:
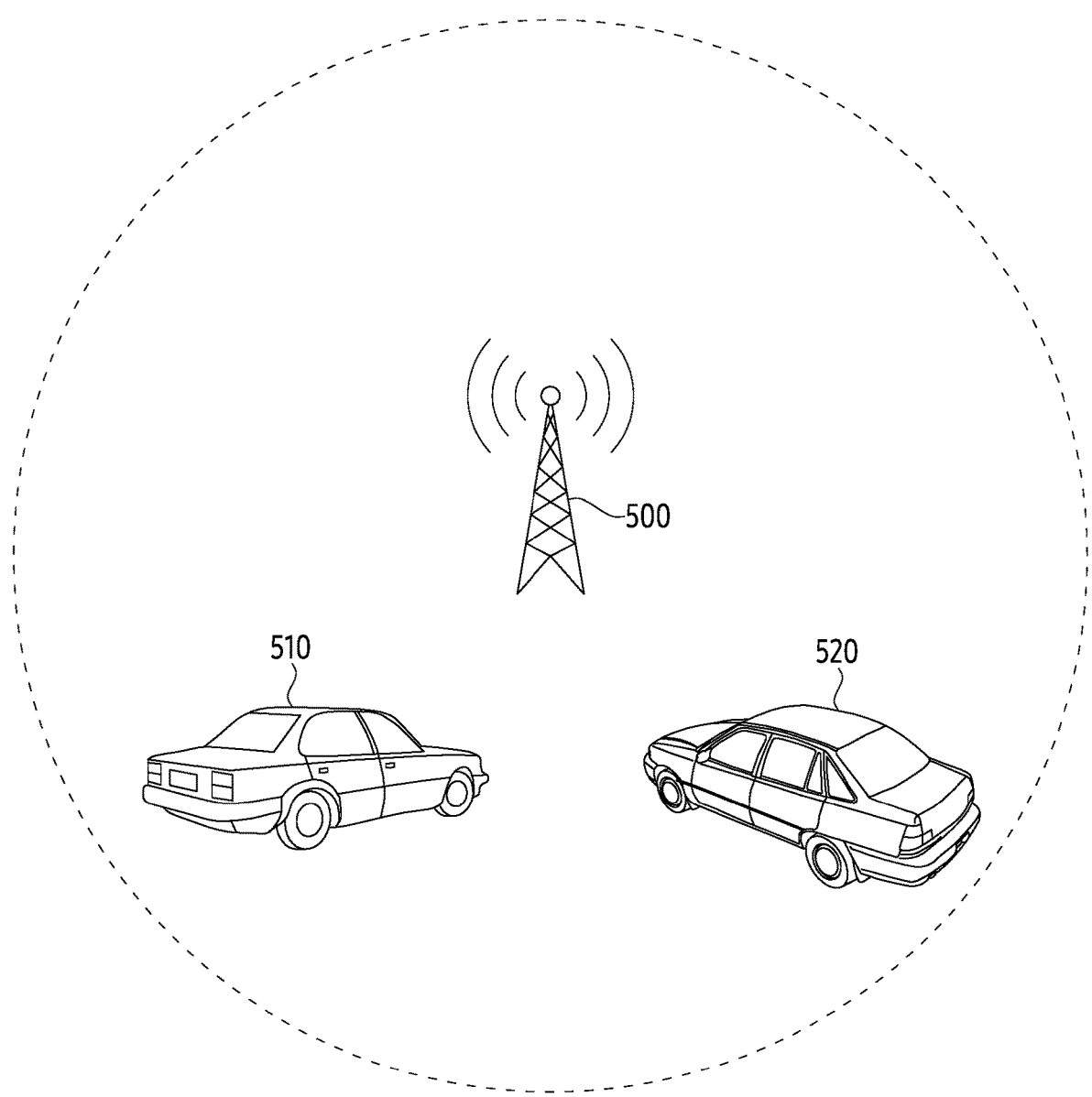
FIG. 5 illustrates an example in which sidelink communication is performed in an unlicensed band.

FIG. 5 illustrates an example in which sidelink communication is performed in an unlicensed band.

Referring to FIG. 5, the UE 1 510 and the UE 2 520 may be located in coverage of the BS 500. The UE 1 510 may receive a DCI related to an unlicensed band from the BS 500. The DCI may include information on a resource in the unlicensed band for performing communication with the UE 2 520. In other words, the UE 2 520 may receive allocation of resources for performing sidelink communication in the unlicensed band from the BS 500.

The UE 1 510 may determine a resource to perform sidelink communication with the UE 2 520 within the unlicensed band based on the allocated resource. For example, the UE 1 510 may determine a resource to perform sidelink communication within the allocated resource through message exchange with the UE 2. The UE 1 510 may perform sidelink communication with the UE 2 520 within the unlicensed band through the determined resource.

Although FIG. 5 illustrates an embodiment in which the UE 1 510 receives information on a resource in the unlicensed band for performing communication with the UE 2 520 from the BS 500 and determines a resource for performing sidelink communication based on the information, it is not limited thereto. The UE 2 520 may also receive information on a resource in the unlicensed band from the BS 500 and determine a resource to perform sidelink communication based on the information.

Second Embodiment—an Embodiment in which Resources are Allocated by User Equipment According to the second embodiment, the UE may be not allocated resources for V2X communication within the unlicensed band by the base station (hereinafter, BS), and may independently allocate (or select) resources. For example, the UE may allocate (or select) resources to transmit data through zone mapping, sensing-based resource selection, or random selection. As another example, the UE may select a resource based on a pre-configured resource pool within the unlicensed band.

For example, the first UE may perform sensing for a designated sensing window time. The first UE may exclude resources transmitted at a higher priority than itself in the selection window after the sensing window, and may randomly select resources from among remaining resources.

A specific example of the second embodiment may be described with reference to FIGS. 6 and 7.

Figure 6:
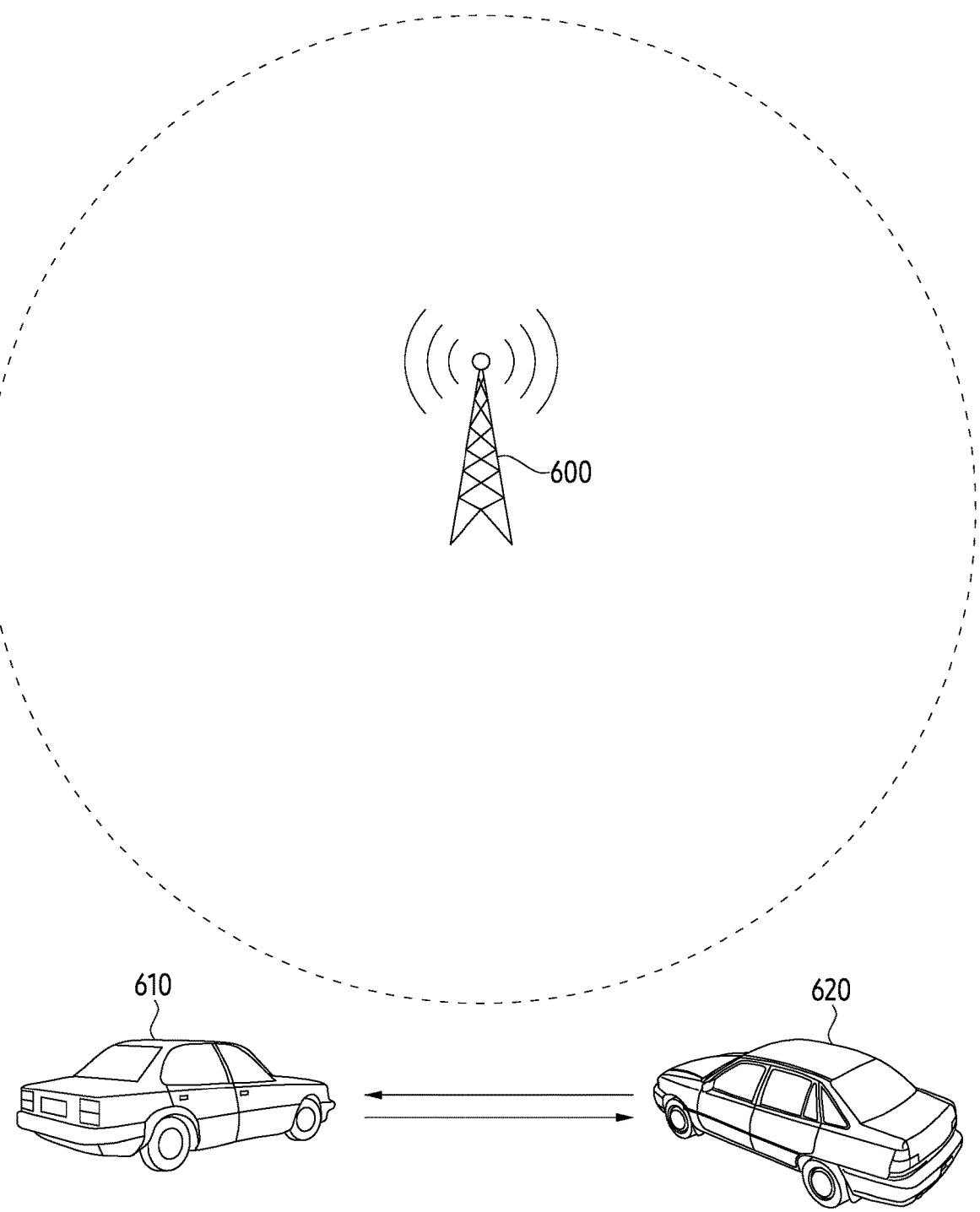
FIG. 6 illustrates an example in which a first UE determines whether to transmit data.

FIG. 6 illustrates an example in which a first UE determines whether to transmit data.

Referring to FIG. 6, the first UE 610 may determine to perform communication with the second UE 620 through sidelink communication on the unlicensed band. The first UE 610 and the second UE 620 may be outside the coverage of the BS 600. The first UE 610 may identify that data (or traffic) to be transmitted to the second UE 620 has been generated.

The first UE 610 may identify pre-configuration information stored in the memory. The memory may include a universal integrated circuit card (UICC) or a universal subscriber identity module (USIM).

The first UE 610 may identify a priority threshold value for the sidelink based on the pre-configuration information. The first UE 610 may compare a priority of data to be transmitted with a priority threshold value related to the sidelink. The first UE 610 may determine to transmit data to the second UE 620 based on that the priority of the data to be transmitted is greater than the priority threshold value for the sidelink.

The above-described priority threshold value for sidelink may be set as a field (or parameter) illustrated in Table 5.

TABLE 5

| Field | Description |
| --- | --- |
| sl-PrioritizationThres | This field indicates the SL priority threshold, which is used to determine whether SL TX is prioritized over UL TX, as specified in TS 38.321 [3]. Network does not configure the sl-PrioritizationThres and the ul-PrioritizationThres to the UE separately |

Referring to Table 5, the priority threshold value may be set as a "sl-PrioritizationThres" field (or parameter). The "sl-PrioritizationThres" field may be used to determine whether a sidelink transmission has a higher priority than an uplink transmission. The network may not separately configure "sl-PrioritizationThres" and "ul-PrioritizationThres".

Figure 7:
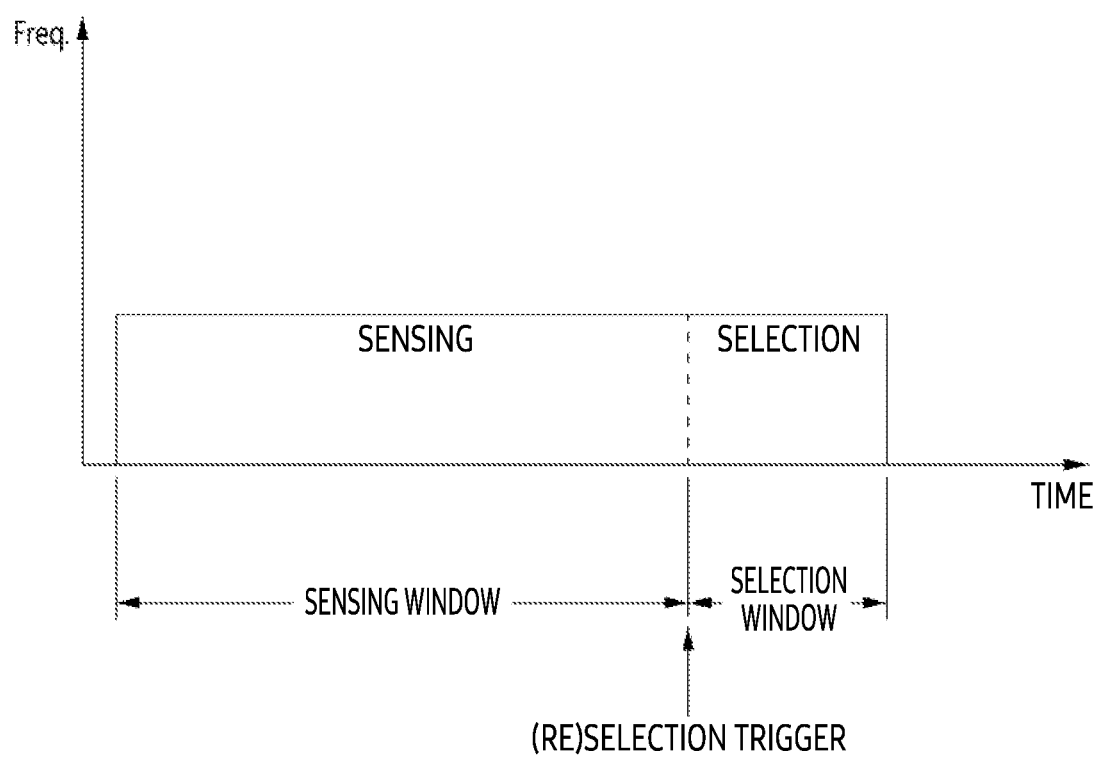
FIG. 7 illustrates an example in which a first UE allocates resources.

FIG. 7 illustrates an example in which a first UE allocates resources.

Referring to FIG. 7, the first UE may set a sensing window. The first UE may identify resources reserved from the second UE or resources used by the second UE through sensing in the sensing window.

For example, the size of the sensing window may include 1100 ms or 100 ms. For example, when the size of the sensing window is set to 100 ms, the first UE may transmit aperiodic traffic (or data). As another example, when the size of the sensing window is set to 1100 ms, the first UE may transmit periodic traffic (or data).

For example, the first UE may identify (or measure) sidelink-reference signal received power (SL-RSRP) in a slot of the sensing window. The SL-RSRP may mean an interference level that affects when a signal is transmitted from the first UE. For example, the first UE may identify the SL-RSRP by decoding the SCI in the sensing process.

Additionally, the first UE may identify (measure) a received signal strength indicator (RSI), or a reference symbol received quality (RSRQ) as well as RSRP (i.e., SL-RSRP).

Specifically, the first UE may decode the PSCCH in the sensing window. The first UE may measure the RSRP based on the PSSCH. The first UE may exclude resources whose RSRP value exceeds the threshold value from the selection window. Thereafter, the first UE may set a candidate group of resources to be used by itself. Accordingly, the first UE may set a resource for transmitting high-priority traffic or a resource having a low RSRP.

When the candidate group is smaller than a specific ratio of available resources, the first UE may mitigate a threshold value of SL-RSRP by 3 dB. In other words, the first UE may reset the candidate group by increasing the threshold value of the SL-RSRP by 3 dB. The specific ratio of the available resources may be set to one of 20%, 35%, or 50%.

Thereafter, the first UE may select a resource for performing the sidelink communication from among the candidate groups. The first UE may re-evaluate the selected resource before transmitting a message through the selected resource. A channel situation during the sensing window and a channel situation when an actual message is transmitted may be changed. Accordingly, the first UE may re-select the resource by evaluating the selected resource again. The first UE may perform sidelink communication with the second UE through the selected (or re-selected) resource.

The resource selected through the above-described embodiment may be effectively set for a designated time. For example, effective probability information on a resource may be set.

For example, the effective probability information on the resource may be pre-configured in the first UE. For example, the effective probability information on the resource may be preconfigured (or stored) in the UICC included in the first UE. As another example, the effective probability information on the resource may be reset from the entity of the core.

The effective probability information on the resource may be set as a field (or parameter) illustrated in Table 6.

TABLE 6

| Field | Description |
|---|---|
| sl-ProbResourceKeep | This field Indicates the probability with which the UE keeps the current resource when the resource reselection counter reaches zero for sensing based UE autonomous resource selection (see TS 38.321 [3]). |

Referring to Table 6, the effective probability information on the resource may be set as a "sl-ProbResourceKeep" field (or parameter). The "sl-ProbResourceKeep" field may indicate the probability of maintaining the selected resource when the resource reselection counter reaches zero for the first UE to select the resource.

Hereinafter, an operation of the first user equipment according to the above-described embodiments may be described. The first user equipment described below may be related to the first UE of the above-described embodiments or the first UE 610 of FIG. 6.

Figure 8:
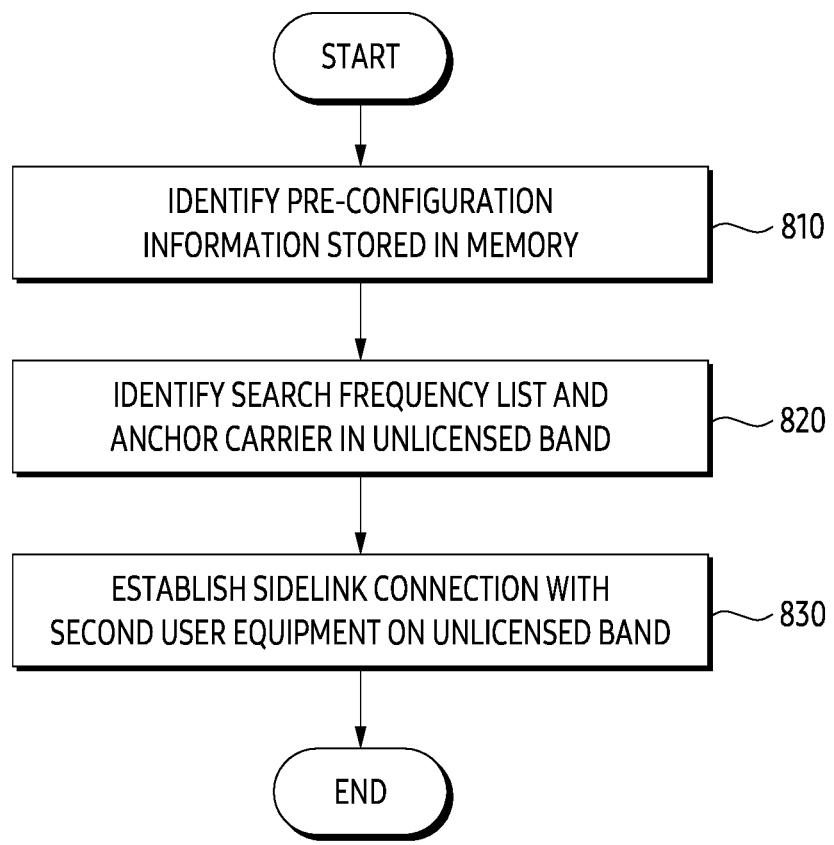
FIG. 8 illustrates an example of an operation of a first user equipment according to various embodiments.

FIG. 8 illustrates an example of an operation of a first user equipment according to various embodiments.

Referring to FIG. 8, in operation 810, the first user equipment (e.g., a processor of the first user equipment) may identify pre-configuration information stored in a memory included in the first user equipment.

For example, the first user equipment may be in a state which is out of coverage of the base station. For example, the first user equipment may include a vehicle, and may be in a state which move out of coverage of the base station, after performing communication within coverage of the base station.

For example, the memory of the first user equipment may be variously configured. The memory may include a universal integrated circuit card (UICC) or a universal subscriber identity modul (USIM).

For example, the pre-configuration information may include various types of information required for sidelink communication. The pre-configuration information may be set in a USIM (or Universal Integrated Circuit Card (UICC) of the first user equipment, or may be reset from an entity of the core.

In operation 820, the first user equipment may identify the search frequency list and anchor carrier in the unlicensed band from the pre-configuration information.

For example, the unlicensed band may include a 5.9 GHz band.

For example, the pre-configuration information may include information on the search frequency list and/or the anchor carrier in the unlicensed band. The search frequency list in the unlicensed band may include frequency list at which the first user equipment may perform sidelink communication with the second user equipment. The search frequency list may be configured with a "Sl-PreconfigFreqInfoList" field (or parameter). The anchor carrier may include a carrier in which configuration information on the search frequency list is transmitted. The anchor carrier may be configured with a "sl-PreconfigNR-AnchorCarrierFreqList" field (or parameter).

In operation 830, the first user equipment may establish a sidelink connection with the second user equipment on the unlicensed band.

For example, the anchor carrier may include a frequency for transmitting and receiving configuration information of the search frequency in the unlicensed band. Accordingly, the first user equipment may identify configuration information of the search frequency list through the anchor carrier in the search frequency list. Thereafter, the first user equipment may determine a frequency to perform sidelink communication with the second user equipment from among the search frequency list.

Figure 9:
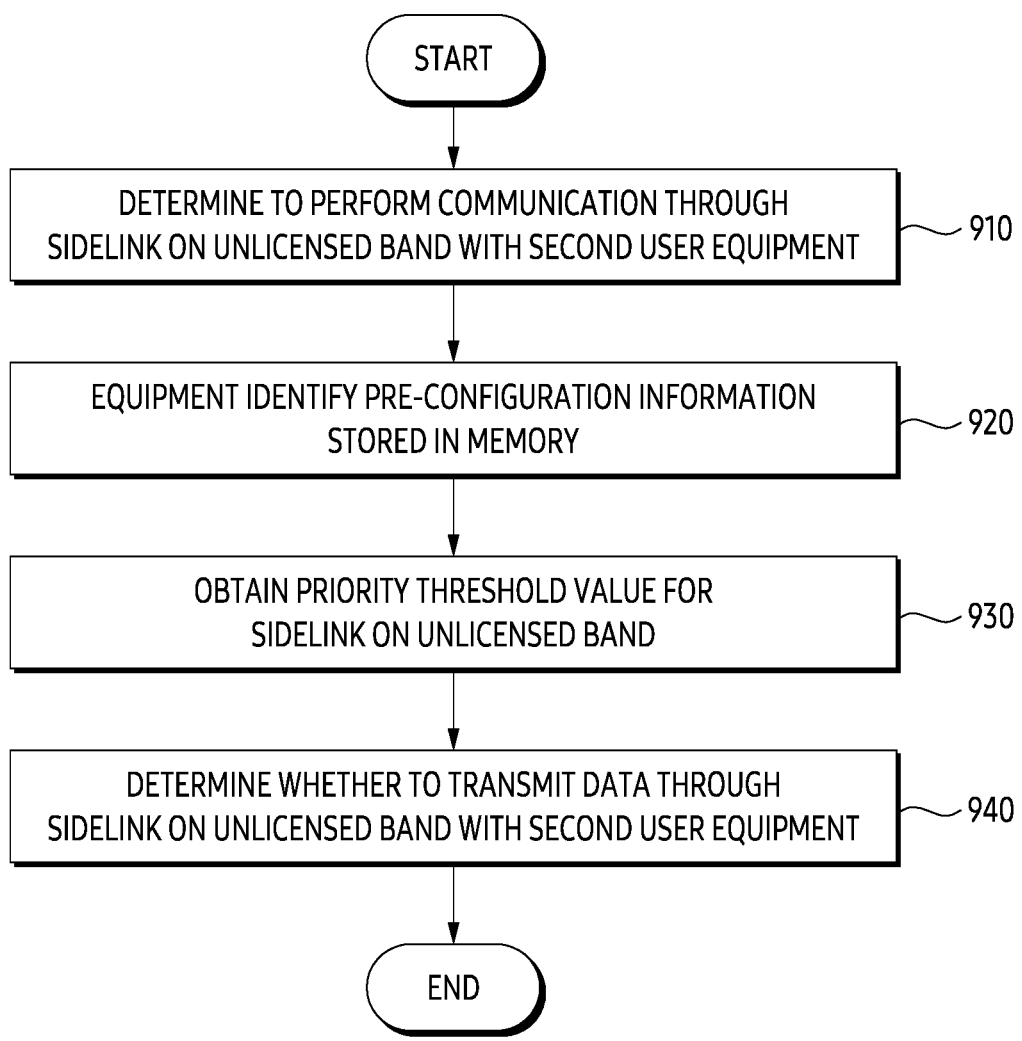
FIG. 9 illustrates another example of an operation of a first user equipment according to various embodiments.

FIG. 9 illustrates another example of an operation of a first user equipment according to various embodiments.

Referring to FIG. 9, in operation 910, the first user equipment (e.g., a processor of the first user equipment) may determine to perform communication through a sidelink on the unlicensed band with the second user equipment.

For example, the first user equipment may be in a state which is out of coverage of the base station. For example, the first user equipment may include a vehicle, and may be in a state which move out of coverage of the base station, after performing communication within coverage of the base station.

The first user equipment may identify that data (or traffic) to be transmitted to the second user equipment has occurred.

When the first user equipment is within the coverage of the base station, the first user equipment may transmit information indicating that data to be transmitted to the second user equipment has been occurred to the base station, and may be allocated resources for communication with the second user equipment through a sidelink from the base station. When the first user equipment is outside the coverage of the base station, the first user equipment may allocate (or select) resources by itself without being allocated resources from the base station.

In operation 920, the first user equipment may identify pre-configuration information stored in the memory.

According to an embodiment, the first user equipment may identify the pre-configuration information stored in the memory based on the determination to perform communication through the sidelink on the unlicensed band with the second user equipment.

For example, the first user equipment may include a memory. The memory may store programs and data required for an operation of the first user equipment. The memory may be configured in various forms. For example, the memory may include a universal subscriber identity module (USIM), a universal integrated circuit card (UICC), or an embedded UICC(eUICC).

For example, the memory of the first user equipment may include pre-configuration information. The pre-configuration information may be stored in the above-described USIM or UICC. The pre-configuration information may include information required for communication through the sidelink. For example, the pre-configuration information may include a priority threshold value for the sidelink on an unlicensed band.

In operation 930, the first user equipment may obtain a priority threshold value for the sidelink on the unlicensed band from the pre-configuration information. For example, the priority threshold value for the sidelink may be used to determine whether to transmit the sidelink. For example, the priority threshold value for the sidelink may be used to determine the priority of the uplink transmission and the sidelink transmission.

In operation 940, the first user equipment may determine whether to transmit data through the sidelink on the unlicensed band with the second user equipment. A detailed operation of operation 940 will be described in FIG. 10.

Figure 10:
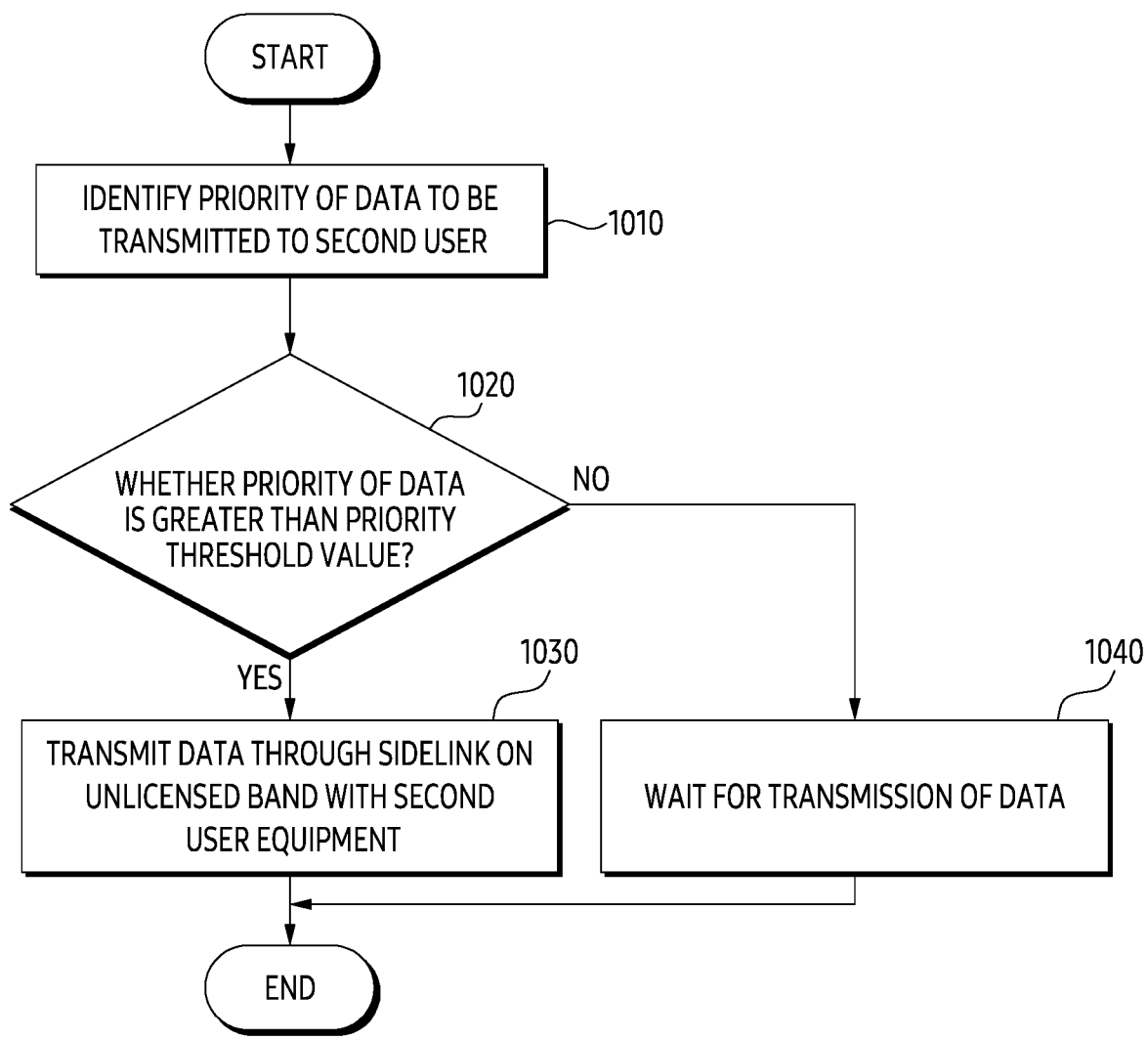
FIG. 10 illustrates still another example of an operation of a first user equipment according to various embodiments.

FIG. 10 illustrates still another example of an operation of a first user equipment according to various embodiments.

Referring to FIG. 10, operations 1010 to 1040 may be related to operation 940 illustrated in FIG. 9.

In operation 1010, the first user equipment (e.g., a processor of the first user equipment) may identify a priority of data to be transmitted to the second user. The first user equipment may identify whether the identified data (or traffic) is data (i.e., uplink data) to be transmitted to the base station or data (i.e., sidelink data) to be transmitted to the second user equipment. The priority of data to be transmitted to the base station may be set higher than the priority of data to be transmitted to the second user equipment. For example, a value indicating priority may be set in various ways. For example, the higher the priority, the greater the value may be set.

In operation 1020, the first user equipment may identify whether the priority of data is greater than the priority threshold value. The first user equipment may transmit data to the second user equipment through a sidelink only when the priority of the data is greater than the priority threshold value.

In operation 1030, when the priority of the data is greater than (or greater than or equal to) the priority threshold value, the first user equipment may transmit data through the sidelink on the unlicensed band with the second user equipment.

In operation 1040, when the priority of data is less than the priority threshold value, the first user equipment may wait for transmission of data. When uplink data (or traffic) exists, the first user equipment may transmit the data to the second user equipment after completing transmission of the uplink data.

According to an embodiment, based on that the priority of data is greater than the priority threshold value, the first user equipment may transmit data through a sidelink on the unlicensed band with the second user equipment.

For example, the priority threshold value may be set as a "sl-PriorityThres" field (or parameter). Accordingly, the first user equipment may transmit data through a sidelink on the unlicensed band only when the priority of the data is greater than the "sl-PrioritizationThres" field (or parameter).

Figure 11:
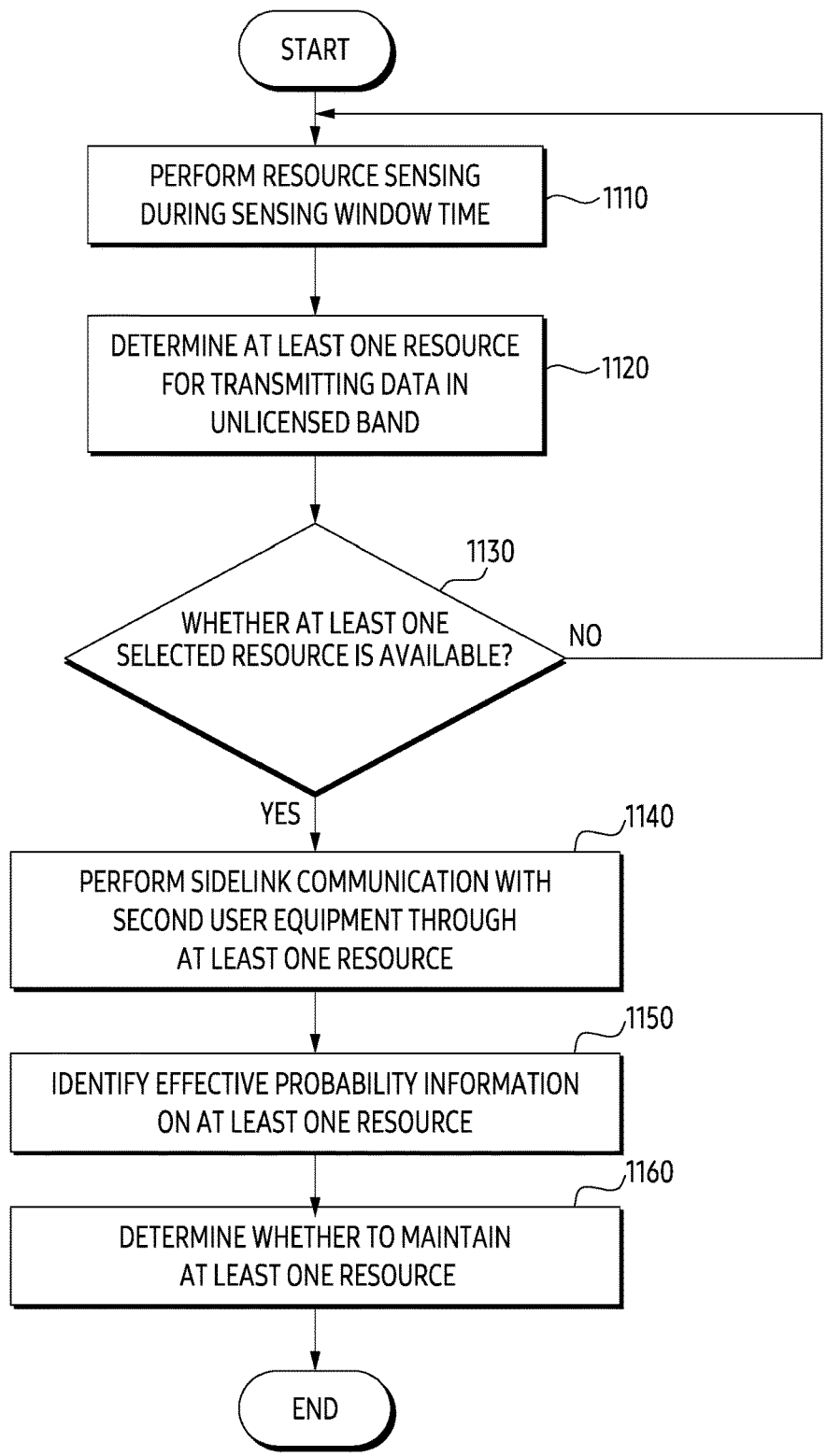
FIG. 11 illustrates still another example of an operation of a first user equipment according to various embodiments.

FIG. 11 illustrates still another example of an operation of a first user equipment according to various embodiments.

Referring to FIG. 11, in operation 1110, the first user equipment (e.g., a processor of the first user equipment) may perform resource sensing during a sensing window time.

According to an embodiment, the first user equipment may set a sensing window for determining at least one resource for transmitting data in an unlicensed band.

For example, the size of the sensing window may include 1100 ms or 100 ms. For example, when the size of the sensing window is set to 100 ms, the first user equipment may transmit aperiodic traffic (or data). As another example, when the size of the sensing window is set to 1100 ms, the first user equipment may transmit periodic traffic (or data).

For example, the first user equipment may identify scheduling information on a resource in the sensing window. For example, the first user equipment may identify scheduling information on the resource by decoding a subframe transmitted in the sensing window.

For example, the first user equipment may identify (or measure) the intensity of a signal transmitted in a slot of the sensing window or the reliability of the signal.

For example, the first user equipment may identify (or measure) a sidelink-reference signal received power (SL-RSRP) in the slot of the sensing window. The SL-RSRP may mean an interference level that affects when a signal is transmitted from the first user equipment.

As another example, the first user equipment may identify (measure) a received signal strength indicator (RSSI) or a reference symbol received quality (RSRQ) as well as an RSRP (i.e., SL-RSRP).

According to an embodiment, the first user equipment may decode the PSCCH of another user equipment (e.g., a second user equipment). In addition, the first user equipment may measure an energy of the PSSCH. The first user equipment may measure RSRP (i.e., SL-RSRP) and identify (or confirm) the measured value.

In operation 1120, the first user equipment may determine at least one resource for transmitting data in the unlicensed band.

According to an embodiment, the first user equipment may determine at least one resource for transmitting data in the unlicensed band based on resource sensing during the sensing window time.

For example, the first user equipment may exclude resources whose RSRP value exceeds the threshold value from the selection window. The first user equipment may set a candidate group of resources to be used by itself.

In other words, the first user equipment may set a candidate group to be used for transmitting data in the unlicensed band among resources whose RSRP value does not exceed a threshold value among a plurality of resources within the selection window.

When the candidate group is smaller than a specific ratio of available resources in the selection window, the first UE may mitigate a threshold value of SL-RSRP by 3 dB. In other words, the first user equipment may reset the candidate group by increasing the threshold value of the SL-RSRP by 3 dB. The specific ratio of the available resources in the selection window may be set to one of 20%, 35%, or 50%. Thereafter, the first user equipment may select (or determine) at least one resource for performing the sidelink communication from among the candidate groups.

In operation 1130, the first user equipment may identify whether at least one selected resource is available before transmitting a message through at least one selected resource. In other words, the first user equipment may re-evaluate at least one selected resource before transmitting the message through at least one selected resource.

For example, a channel situation during the sensing window and a channel situation when the message is actually transmitted may be changed. Accordingly, the first user equipment may reselect (or re-determine) at least one resource by evaluating the selected resource again.

When the selected at least one resource cannot be used, the first user equipment may reselect at least one resource by performing operations 1110 to 1130 again.

In operation 1140, the first user equipment may perform the sidelink communication with the second user equipment through at least one selected (or re-selected) resource. In other words, the first user equipment may transmit data to the second user equipment through at least one resource.

In operation 1150, the first user equipment may identify effective probability information on at least one resource based on the pre-configuration information.

For example, at least one resource may be allocated to the first user equipment for a designated effective time. The first user equipment may be required to reset a resource for re-performing the sidelink communication after the effective time has elapsed. Accordingly, the first user equipment may reduce a value of the resource re-selection counter after selecting at least one resource. In a state that the value of the resource re-selection counter reaches 0, at least one resource may be identified as effective probability information. In other words, effective probability information of at least one of resource may be identified based on the value of the resource reselection counter being set to 0.

In operation 1160, the first user equipment may determine whether to maintain at least one resource based on the effective probability information of the at least one of resource.

For example, the first user equipment may maintain at least one resource based on the effective probability information of the at least one of resource. The first user equipment may continuously perform sidelink communication based on at least one resource.

For another example, the first user equipment may not maintain at least one resource based on at least one of effective probability information. The first user equipment may perform operations 1110 to 1140, again. Thereafter, the user equipment may perform sidelink communication based on the newly allocated resource.

Figure 12:
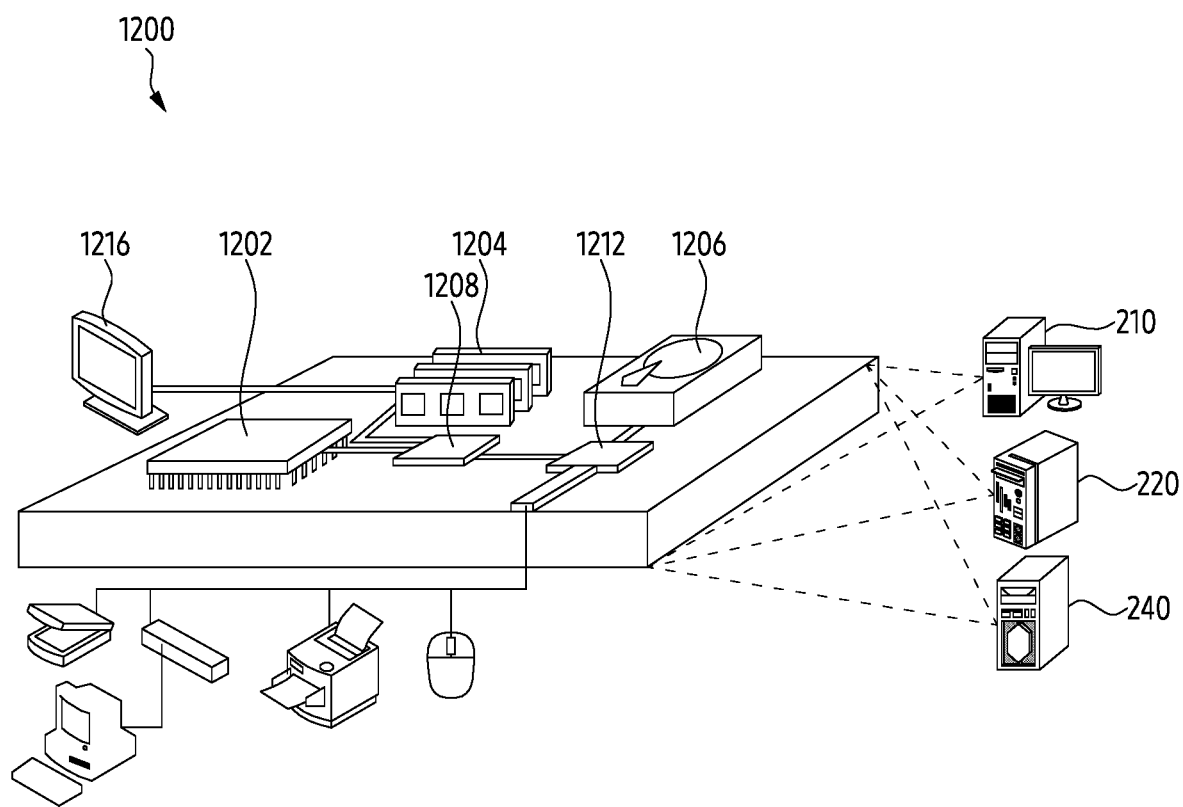
FIG. 12 is a simplified block diagram of user equipment according to various embodiments.

FIG. 12 is a simplified block diagram of electronic devices according to various embodiments.

Referring to FIG. 12, the electronic device 1200 may be an example of the electronic device 210, the electronic device 220, or the electronic device 240. The electronic device 1200 may comprise a processor 1202, a memory 1204, a storage device 1206, high-speed controller 1208 (e.g., northbridge, MCH (Main Controller Hub)) and low-speed controller 1212 (e.g., southbridge, ICH (I/O controller hub)). In the electronic device 1200, each of the processor 1202, the memory 1204, the storage device 1206, the fast controller 1208, and the slow controller 1212 may be interconnected using various buses.

For example, the processor 1202 may process instructions for execution in the electronic device 1200 in order to display graphic information on a graphical user interface (GUI) on an external input/output device such as display 1216 connected to high-speed controller 1208. The instructions may be comprised in the memory 1204 or the storage device 1206. The instructions may cause the electronic device 1200 to perform one or more of the above-described operations when executed by processor 1202. According to embodiments, the processor 1202 may be composed of a plurality of processors including a communication processor and a GPU (graphical processing unit).

For example, the memory 1204 may store information in the electronic device 1200. For example, the memory 1204 may be a volatile memory unit or units. As another example, the memory 1204 may be a nonvolatile memory unit or units. For another example, memory 1204 may be another type of computer-readable medium, such as a magnetic or optical disk.

For example, the storage device 1206 may provide a mass storage space to the electronic device 1200. For example, storage device 1206 may be a computer-readable medium such as a hard disk device, an optical disk device, flash memory, solid state memory devices, or an array of devices in a storage area network (SAN).

For example, the high-speed controller 1208 may manage bandwidth-intensive operations for electronic device 1200, while low-speed controller 1212 may manage low bandwidth-intensive operations for electronic device 1200. For example, the high-speed controller 1208 may be coupled to the memory 1204 and coupled to the display 1216 through a GPU or accelerator, while the low speed controller 1212 may be coupled to the storage device 1206 and coupled to various communication ports (e.g., universal serial bus (USB), Bluetooth, Ethernet, wireless Ethernet) for communication with an external electronic device (e.g., keyboard, transducer, scanner, or network device (e.g., switch or router)).

According to various embodiments, a first user equipment (UE) may comprise a memory; a transceiver to transmit and receive a wireless signal; and a processor connected with the memory and the transceiver, wherein the processor may be configured to determine to perform communication through a sidelink on unlicensed band with a second UE while the first UE is in a state which is out of coverage of a base station, based on the determination, identify pre-configuration information stored in the memory, obtain a priority threshold value for the sidelink on the unlicensed band from the pre-configuration information, and determine, based on the priority threshold value, whether to transmit data through the sidelink on the unlicensed band with the second UE.

According to an embodiment, the processor may be configured to identify priority of the data, identify whether the priority of the data is greater than the priority threshold value, and based on that the priority of the data is greater than the priority threshold value, transmit the data through the sidelink on the unlicensed band with the second UE.

According to an embodiment, the memory may comprise universal integrated circuit card (UICC).

According to an embodiment, the priority threshold value related to the sidelink may be pre-configured in the memory.

According to an embodiment, the processor may be further configured to performing resource sensing during a sensing window, and determine, based on the sensing, at least one resource to transmit the data on the unlicensed band.

According to an embodiment, the pre-configuration information may further include effective probability information.

According to an embodiment, the processor may be further configured to determine, based on the effective probability information, whether to maintain the at least one resource.

According to an embodiment, the processor may be further configured to transmit the data through the at least one resource.

According to an embodiment, the unlicensed band may include 5.9 GHz band.

According to various embodiments, a first user equipment (UE) may comprise a memory; a transceiver to transmit and receive a wireless signal; and a processor connected with the memory and the transceiver, wherein the processor may be configured to identify pre-configuration information stored in the memory while the first UE is in a state which is out of coverage of a base station, identify a search frequency list and an anchor carrier on unlicensed band from the pre-configuration information, and establish, based on the search frequency list and the anchor carrier on the unlicensed band, sidelink connection on the unlicensed band with a second UE.

According to an embodiment, the processor may be further configured to identify, based on the anchor carrier, configuration information on the search frequency list, and based on the configuration information, determine frequency to establish the sidelink connection in the search frequency list.

According to an embodiment, the memory may comprise universal integrated circuit card (UICC).

According to an embodiment, the search frequency list and the anchor carrier on the unlicensed band may be pre-configured in the memory.

According to various embodiments, a method for operating a first user equipment (UE) may comprise determining to perform communication through a sidelink on unlicensed band with a second UE while the first UE is in a state which is out of coverage of a base station, based on the determination, identifying pre-configuration information stored in the memory, obtaining a priority threshold value for the sidelink on the unlicensed band from the pre-configuration information, and determining, based on the priority threshold value, whether to transmit data through the sidelink on the unlicensed band with the second UE.

According to an embodiment, the method may further comprise identifying priority of the data, identifying whether the priority of the data is greater than the priority threshold value, and based on that the priority of the data is greater than the priority threshold value, transmitting the data through the sidelink on the unlicensed band with the second UE.

According to an embodiment, the memory may comprise universal integrated circuit card (UICC).

According to an embodiment, the priority threshold value related to the sidelink may be pre-configured in the memory.

According to an embodiment, the method may further comprise performing resource sensing during a sensing window, and determine, based on the sensing, at least one resource to transmit the data on the unlicensed band.

According to an embodiment, the pre-configuration information may further include effective probability information.

According to an embodiment, the method may further comprise determining, based on the effective probability information, whether to maintain the at least one resource.

According to an embodiment, the method may further comprise transmitting the data through the at least one resource.

According to an embodiment, the unlicensed band may include 5.9 GHz band.

According to various embodiments, a method for operating a first user equipment (UE) in wireless communication system may comprise identifying pre-configuration information stored in the memory while the first UE is in a state which is out of coverage of a base station, identifying a search frequency list and an anchor carrier on unlicensed band from the pre-configuration information, and establishing, based on the search frequency list and the anchor carrier on the unlicensed band, sidelink connection on the unlicensed band with a second UE.

According to an embodiment, the method may further comprise identifying, based on the anchor carrier, configuration information on the search frequency list, and based on the configuration information, determining frequency to establish the sidelink connection in the search frequency list.

According to various embodiments, the memory may comprise universal integrated circuit card (UICC).

According to various embodiments, the search frequency list and the anchor carrier on the unlicensed band may be pre-configured in the memory.

According to various embodiments, a computer readable storage medium may store one or more programs, wherein the one or more programs may comprise instructions which cause the first electronic device to determine to perform communication through a sidelink on unlicensed band with a second UE while the first UE is in a state which is out of coverage of a base station, based on the determination, identify pre-configuration information stored in the memory, obtain a priority threshold value for the sidelink on the unlicensed band from the pre-configuration information, and determine, based on the priority threshold value, whether to transmit data through the sidelink on the unlicensed band with the second UE.

According to various embodiments, a computer readable storage medium may store one or more programs, wherein the one or more programs may comprise instructions which cause the first electronic device to identify pre-configuration information stored in the memory while the first UE is in a state which is out of coverage of a base station, identify a search frequency list and an anchor carrier on unlicensed band from the pre-configuration information, and establish, based on the search frequency list and the anchor carrier on the unlicensed band, sidelink connection on the unlicensed band with a second UE.

The user equipment according to the above-described embodiments may include a vehicle. When the user equipment according to the above-described embodiments is a vehicle, the side link communication according to the above-described embodiments may mean V2X communication. Accordingly, a detailed configuration of a vehicle, which is a user equipment for performing the above-described embodiments, may be described in FIGS. 13 to 15.

Figure 13:
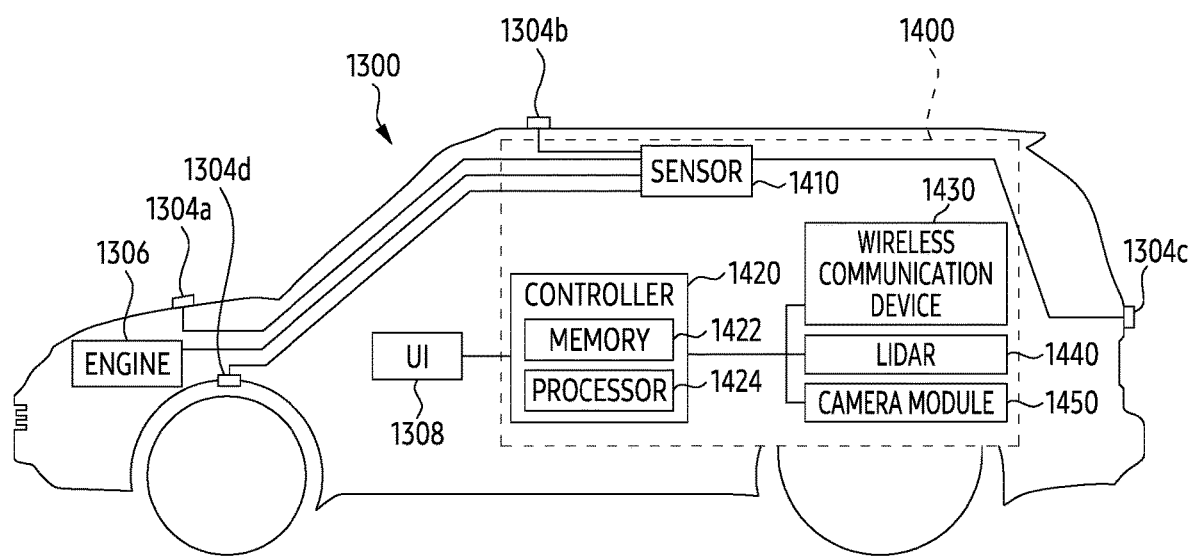
FIG. 13 illustrates an example of a user equipment according to various embodiments.

FIG. 13 illustrates an example of a user equipment according to various embodiments.

Figure 14:
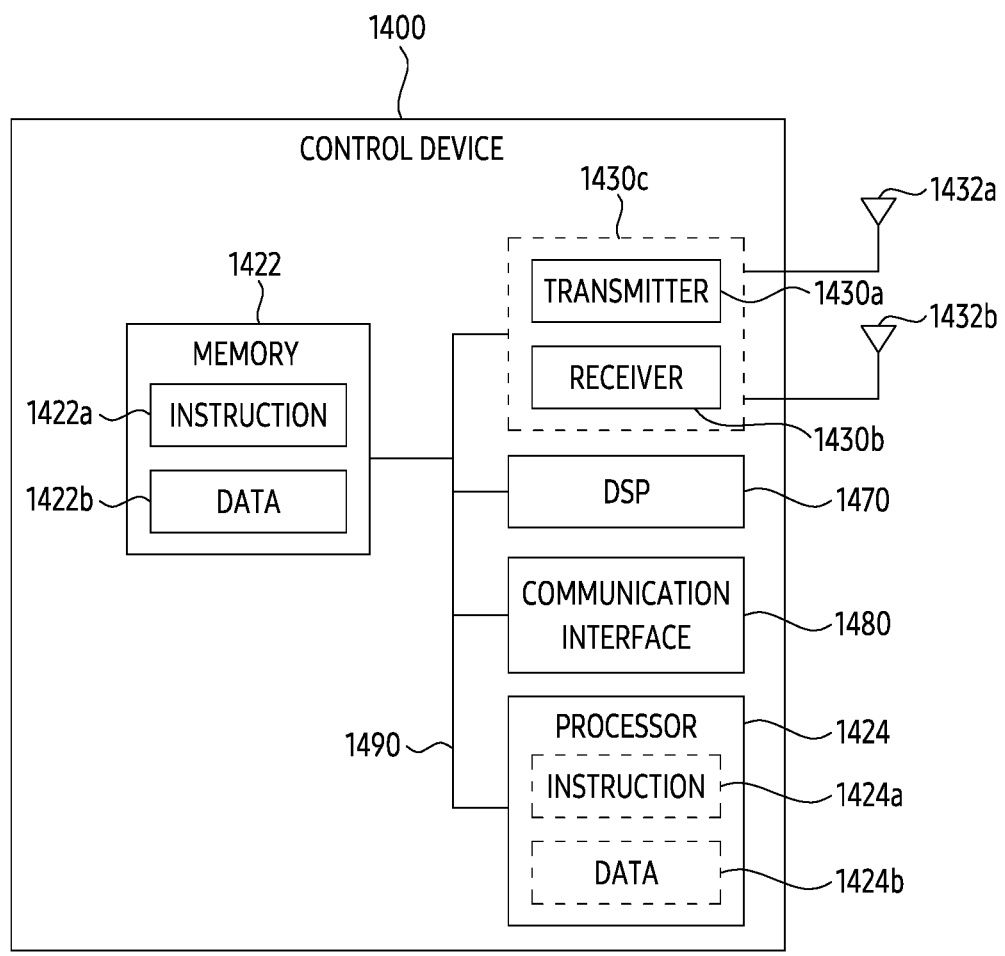
FIG. 14 illustrates an example of a functional configuration of a user equipment according to various embodiments.

FIG. 14 illustrates an example of a functional configuration of a user equipment according to various embodiments.

Figure 15:
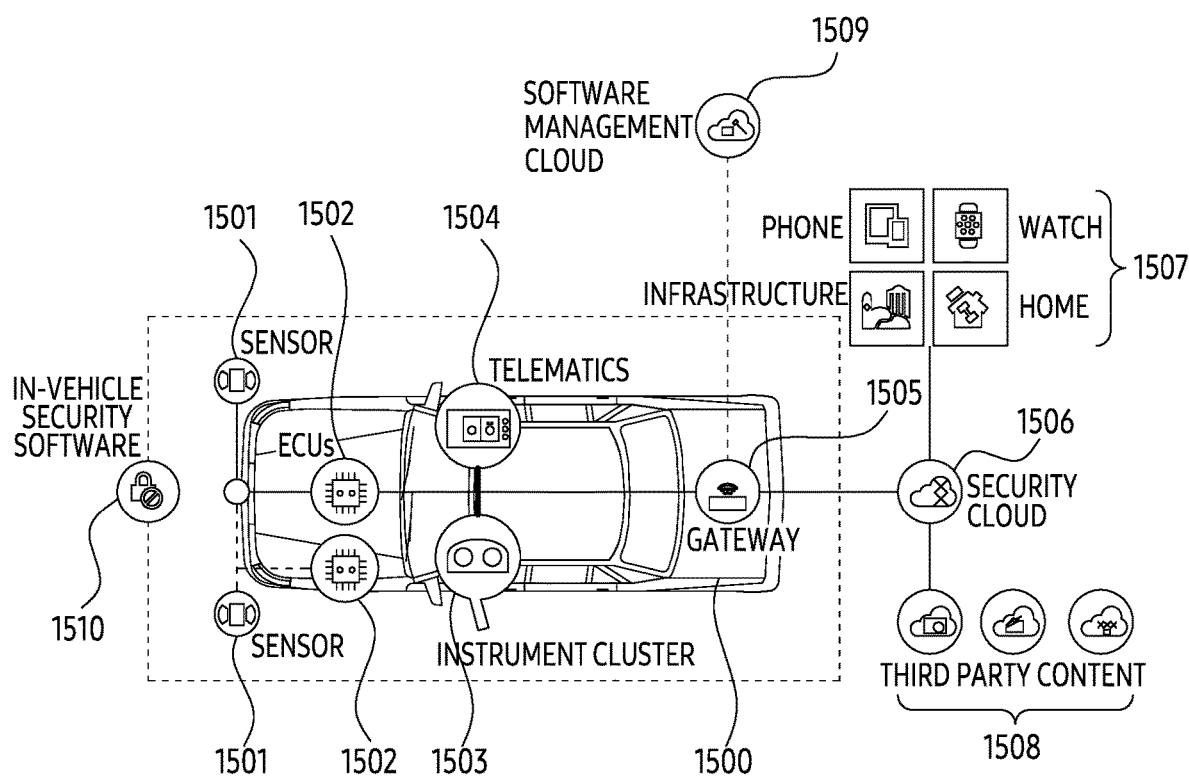
FIG. 15 illustrates an example of a gateway related to a user equipment according to various embodiments.

FIG. 15 illustrates an example of a gateway related to a user equipment according to various embodiments.

Referring to FIGS. 13 to 15, the control device 1400 according to various embodiments may be mounted on the vehicle 1300.

In various embodiments, the control device 1400 may include a controller 1420 including a memory 1422 and a processor 1424, and a sensor 1430.

According to various embodiments, the controller 1420 may be configured by a manufacturer of a vehicle or may be additionally configured to perform a function of autonomous driving after manufacturing. Alternatively, a configuration for continuously performing additional functions may be included through an upgrade of the controller 1420 configured during manufacturing.

The controller 1420 may transmit the control signal to the sensor 1410, the engine 1306, the user interface 1308, the wireless communication device 1430, the LIDAR 1440, and the camera module 1450 included in other components in the vehicle. In addition, although not shown, the controller 1420 may transmit a control signal to an acceleration device, a braking system, a steering device, or a navigation device related to driving of the vehicle.

In various embodiments, the controller 1420 may control the engine 1306, for example, detect the speed limit on the road where the autonomous vehicle 1300 is traveling, control the engine 1306 so that the driving speed does not exceed the speed limit, or control the engine 1306 to accelerate the driving speed of the autonomous vehicle 1300 within a speed limit. In addition, when sensing modules 1304*a*, 1304*b*, 1304*c*, and 1304*d* detect the environment outside the vehicle and transmit it to the sensor 1410, the controller 1420 may receive it and generate a signal for controlling the engine 1306 or the steering device (not shown) to control driving of the vehicle.

When there is another vehicle or obstruction in front of the vehicle, the controller 1420 may control the engine 1306 or the braking system to decelerate the driving vehicle and in addition to speed, control a trajectory, a driving path, and a steering angle. Alternatively, the controller 1420 may control driving of the vehicle by generating a necessary control signal according to recognition information of other external environments such as a driving lane of the vehicle and a driving signal.

By performing communication with neighboring vehicles or central servers in addition to generating their own control signals and transmitting commands for controlling peripheral devices through the received information, the controller 1420 may also control driving of the vehicle.

In addition, when the position of the camera module 1450 is changed or the angle of view is changed, accurate vehicle or lane recognition may be difficult, to prevent this, the controller 1420 may generate a control signal for controlling the camera module 1450 to perform calibration. In other words, even when the mounting position of the camera module 1450 is changed due to vibration or impact generated by the movement of the autonomous vehicle 1300, the controller 1420 may continuously maintain a normal mounting position, direction, and angle of view of the camera module 1450 by generating a calibration control signal to the camera module 1450. When the initial mounting position, direction, and angle of view information of the camera module 1450 stored in advance and the initial mounting position, direction, and angle of view information of the camera module 1450 measured while driving of the autonomous vehicle 1300 vary above a threshold value, the controller 1420 may generate a control signal to perform calibration of the camera module 1450.

According to various embodiments, the controller 1420 may comprise a memory 1422 and a processor 1424. The processor 1424 may execute the software stored in the memory 1422 according to the control signal of the controller 1420. Specifically, the controller 1420 stores data and instructions for scrambling audio data according to various embodiments in the memory 1422, and the instructions may be executed by processor 1424 to implement one or more methods disclosed herein.

In various embodiments, the memory 1422 may be stored in a recording medium executable by the processor 1424. The memory 1422 may store software and data through an appropriate internal and external device. The memory 1422 may be configured as a device connected to random access memory (RAM), read only memory (ROM), hard disk, and dongle.

The memory 1422 may store at least an operating system (OS), a user application, and executable commands. The memory 1422 may also store application data and array data structures.

The processor 1424 may be a controller, microcontroller, or state machine as a microprocessor or an appropriate electronic processor.

The processor 1424 may be implemented as a combination of computing devices, the computing device may be a digital signal processor, microprocessor, or configured in an appropriate combination thereof.

In addition, according to various embodiments, the control device 1400 may monitor internal and external features of the autonomous vehicle 1300 and detect a state thereof with at least one sensor 1410.

The sensor 1410 may be configured with at least one sensing module 1304 (e.g., sensor 1304*a*, sensor 1304*b*, sensor 1304*c*, and sensor 1304*d*), the sensing module 1304 may be implemented at a specific location of the autonomous vehicle 1300 according to the sensing purpose. For example, the sensing module 1304 may be located at a lower end, a rear end, a front end, an upper end, or a side end of the autonomous vehicle 1300, and may also be located at an internal component or tire of the vehicle.

Through this, the sensing module 1304 may detect information related to driving, such as engine 1306, tire, steering angle, speed, vehicle weight, and the like, as internal information of the vehicle. In addition, at least one sensing module 1304 may include an acceleration sensor, a gyroscope, an image sensor, a RADAR, an ultrasonic sensor, a LiDAR sensor and the like, and detect movement information of the autonomous vehicle 1300.

The sensing module 1304 may receive specific data on an external environmental state such as state information of a road on which the autonomous vehicle 1300 is located, surrounding vehicle information, weather, and the like, and may detect vehicle parameters accordingly. The detected information may be stored in the memory 1422, temporarily or in the long term, depending on the purpose.

According to various embodiments, the sensor 1410 may integrate and collect information of sensing modules 1304 for collecting information generated inside and outside the autonomous vehicle 1300.

The control device 1400 may further comprise a wireless communication device 1430.

The wireless communication device 1430 is configured to implement wireless communication between autonomous vehicles 1300. For example, the autonomous vehicle 1300 may communicate with a user's mobile phone, another wireless communication device 1430, another vehicle, a central device (traffic control device), a server, and the like. The wireless communication device 1430 may transmit and receive a wireless signal according to a connection wireless protocol. A wireless communication protocols may be Wi-Fi, Bluetooth, Long-Term Evolution (LTE), Code Division Multiple Access (CDMA), Wideband Code Division Multiple Access (WCDMA), Global Systems for Mobile Communications (GSM), and the communication protocol is not limited thereto.

In addition, according to various embodiments, in addition, according to various embodiments, the autonomous vehicle 1300 may implement communication between vehicles through the wireless communication device 1430. In other words, the wireless communication device 1430 may communicate with other vehicles and other vehicles on the road through V2V (vehicle-to-vehicle communication or V2X). The autonomous vehicle 1300 may transmit and receive information such as a driving warning and traffic information through communication between vehicles and may request information or receive requests from other vehicles. For example, the wireless communication device 1430 may perform V2V communication with a dedicated short-range communication (DSRC) device or a cellular-V2V (C-V2V) device. Besides communication between vehicles, V2X (vehicle to everything communication) between the vehicle and other objects (e.g., electronic devices carried by pedestrians) may also be implemented through the wireless communication device 1430.

In addition, the control device 1400 may comprise the LIDAR device 1440. The LIDAR device 1440 may detect an object around the autonomous vehicle 1300 during operation Using data sensed through a LIDAR sensor. The LIDAR device 1440 may transmit the detected information to the controller 1420, and the controller 1420 may operate the autonomous vehicle 1300 according to the detection information. For example, when there is a vehicle ahead moving at low speed in the detection information, the controller 1420 may command the vehicle to slow down through the engine 1306. Alternatively, the vehicle may be ordered to slow down according to the curvature of the curve into which it is entering.

The control device 1400 may further comprise a camera module 1450. The controller 1420 may extract object information from an external image photographed by the camera module 1450 and allow the controller 1420 to process information on the information.

In addition, the control device 1400 may further comprise imaging devices for recognizing an external environment. In addition to the LIDAR 1440, RADAR, GPS devices, driving distance measuring devices (Odometry), and other computer vision devices may be used, and these devices operate selectively or simultaneously as needed to enable more precise detection.

The autonomous vehicle 1300 may further comprise a user interface 1308 for user input to the control device 1400 described above. User interface 1308 may allow the user to input information with appropriate interaction. For example, it may be implemented as a touch screen, a keypad, an operation button, or the like. The user interface 1308 may transmit an input or command to the controller 1420, and the controller 1420 may perform a vehicle control operation in response to the input or command.

In addition, the user interface 1308 may perform communication with the autonomous vehicle 1300 through the wireless communication device 1430 which is a device outside the autonomous vehicle 1300. For example, the user interface 1308 may enable interworking with a mobile phone, tablet, or other computer device.

Furthermore, according to various embodiments, although the autonomous vehicle 1300 is described as including the engine 1306, may also comprise other types of propulsion systems. For example, the vehicle may be operated with electrical energy and may be operated through hydrogen energy, or a hybrid system combined with the same. Accordingly, the controller 1420 may include a propulsion mechanism according to a propulsion system of the autonomous vehicle 1300 and provide a control signal accordingly to the components of each propulsion mechanism.

Hereinafter, a detailed configuration of the control device 1400 for scrambling audio data according to various embodiments will be described in more detail with reference to FIG. 14.

The control device 1400 includes a processor 1424. The processor 1424 may be a general purpose single or multi-chip microprocessor, a dedicated microprocessor, a microcontroller, a programmable gate array, or the like. The processor may be referred to as a central processing unit (CPU). In addition, according to various embodiments, the processor 1424 may be used as a combination of a plurality of processors.

The control device 1400 also comprises a memory 1422. The memory 1422 may be any electronic component capable of storing electronic information. The memory 1422 may also include a combination of memories 1422 in addition to a single memory.

According to various embodiments, data and instructions 1422a for scrambling audio data may be stored in the memory 1422. When the processor 1424 executes the instructions 1422a, the instructions 1422a and all or part of the data 1422b required for executing the instructions may be loaded onto the processor 1424 (e.g., the instructions 1424a, the data 1424b).

The control device 1400 may include a transmitter 1430a, a receiver 1430b, or a transceiver 1430c for allowing transmission and reception of signals. One or more antennas 1432a and 1432b may be electrically connected to a transmitter 1430a, a receiver 1430b, or each transceiver 1430c, and may additionally comprise antennas.

The control device 1400 may comprise a digital signal processor DSP 1470. The DSP 1470 may enable the vehicle to quickly process the digital signal.

The control device 1400 may comprise a communication interface 1480. The communication interface 1480 may comprise one or more ports and/or communication modules for connecting other devices to the control device 1400. The communication interface 1480 may allow the user and the control device 1400 to interact.

Various configurations of the control device 1400 may be connected together by one or more buses 1490, the buses 1490 may comprise a power bus, a control signal bus, a state signal bus, a data bus, and the like. Under the control of the processor 1424, the configurations may transmit mutual information and perform a desired function through the bus 1490.

Meanwhile, in various embodiments, the control device 1400 may be related to a gateway for communication with the secure cloud. For example, referring to FIG. 15, the control device 1400 may be related to the gateway 1505 for providing information obtained from at least one of the components 1501 to 1504 of the vehicle 1500 to the secure cloud 1506. For example, the gateway 1505 may be comprised in the control device 1400. For another example, gateway 1505 may be configured as a separate device in vehicle 1500 distinguished from control device 1400. Gateway 1505 connects software management cloud 1509 having different networks, secure cloud 1506 and network in secured vehicle 1500 by in-vehicle security software 1510 to be enable communication.

For example, component 1501 may be a sensor. For example, the sensor may be used to obtain information on at least one of a state of the vehicle 1500 or a state around the vehicle 1500. For example, component 1501 may comprise a sensor 1410.

For example, component 1502 may be electronic control units (ECUs). For example, the ECUs may be used for engine control, transmission control, airbag control, and tire pressure management.

For example, component 1503 may be an instrument cluster. For example, the instrument cluster may refer to a panel positioned in front of a driver's seat among dashboards. For example, the instrument cluster may be configured to show information necessary for driving to a driver (or passenger). For example, the instrument cluster may be used to display at least one of Visual elements for indicating revolution per minute (RPM), the speed of the vehicle 1500, the amount of residual fuel, gear conditions and information obtained through component 1501.

For example, component 1504 may be a telematics device. For example, the telematics device may refer to a device that provides various mobile communication services such as location information and safe driving in a vehicle 1500 by combining wireless communication technology and global positioning system (GPS) technology. For example, the telematics device may be used to connect the driver, the cloud (e.g., secure cloud 1506), and/or the surrounding environment to the vehicle 1500. For example, the telematics device may be configured to support high bandwidth and low latency for technology of 5G NR standard (e.g., V2X technology of 5G NR). For example, the telematics device may be configured to support autonomous driving of the vehicle 1500.

For example, gateway 1505 may be used to connect a network in the vehicle 1500 to a software management cloud 1509, which are out-of-vehicle networks and a secure cloud 1506. For example, the software management cloud 1509 may be used to update or manage at least one software required for driving and managing the vehicle 1500. For example, the software management cloud 1509 may be linked with in-car security software 1510 installed in the vehicle. For example, in-vehicle security software 1510 may be used to provide a security function in the vehicle 1500. For example, the in-vehicle security software 1510 may encrypt data transmitted and received through the in-vehicle network using an encryption key obtained from an external authorized server for encryption of the in-vehicle network. In various embodiments, the encryption key used by in-vehicle security software 1510 may be generated corresponding to vehicle identification information (vehicle license plate, or information uniquely assigned to each user (e.g., user identification information, vehicle identification number).

In various embodiments, gateway 1505 may transmit data encrypted by in-vehicle security software 1510 to software management cloud 1509 and/or secure cloud 1506 based on the encryption key. Software management cloud 1509 and/or secure cloud 1506 may identify that data was received from which vehicle or from which user, by decrypting the data encrypted by the encryption key of the security software 1510 in the vehicle using a decryption key capable of decrypting the data. For example, since the decryption key is a unique key corresponding to the encryption key, the software management cloud 1509 and/or the secure cloud 1506 may identify a sender (e.g., a vehicle or a user) of data based on the decryption key.

For example, gateway 1505 may be configured to support in-vehicle security software 1510 and may be related to control device 1400. For example, gateway 1505 may be related to control device 1400 to support a connection between client device 1507 connected to secure cloud 1506 and control device 1400. For another example, gateway 1505 may be related to control device 1400 to support a connection between third-party cloud 1508 connected to secure cloud 1506 and control device 1400. However, it is not limited thereto.

In various embodiments, the gateway 1505 may be used to connect the vehicle 1500 with the software management cloud 1509 for managing the operating software of the vehicle 1500. For example, the software management cloud 1509 may monitor whether update of the operating software of the vehicle 1500 is required and provide data for updating the operating software of the vehicle 1500 through the gateway 1505 based on monitoring the request for updating the operating software of the vehicle 1500. For another example, the software management cloud 1509 may receive a user request for updating the operating software of the vehicle 1500 from the vehicle 1500 through the gateway 1505 and provide data for updating the operating software of the vehicle 1500 based on the reception. However, it is not limited thereto.

The device described above may be implemented as a hardware component, a software component, and/or a combination of hardware components and software components. For example, the devices and components described in the embodiments may be implemented using one or more general purpose computers or special purpose computers such as processor, controller, ALU (arithmetic logic unit), digital signal processor, microcomputer, FPGA (field programmable gate array), PLU (programmable logic unit), microprocessor or any other device capable of executing and responding to instructions. The processing device may perform an operating system (OS) and one or more software applications performed on the operating system. In addition, the processing device may access, store, manipulate, process, and generate data in response to execution of the software. For convenience of understanding, although it may be described that one processing device is used, a person skilled in the art may see that the processing device may include a plurality of processing elements and/or a plurality of types of processing elements. For example, the processing device may include a plurality of processors or one processor and one controller. In addition, other processing configurations such as parallel processors are possible.

The software may comprise a computer program, code, instruction, or a combination of one or more of these, configure the processing device to operate as desired, or command the processing device independently or collectively. Software and/or data may be embodied in any type of machine, component, physical device, computer storage medium, or device to be interpreted by a processing device or to provide instructions or data to a processing device. The software may be distributed on networked computer systems and stored or executed in a distributed manner. Software and data may be stored in one or more computer-readable recording media.

The method according to the embodiment may be implemented in the form of a program command that may be performed through various computer means and recorded on a computer-readable medium. In this case, the medium may continue to store a computer-executable program, or may temporarily store the program for execution or download. In addition, the medium may be various recording or storage means in which a single or several hardware is combined, and may not be limited to a medium directly connected to a computer system, but may be distributed over a network. Examples of media comprise magnetic media such as hard disks, floppy disks, and magnetic tape, optical recording media such as CD-ROM and DVD, magneto-optical medium, such as a floptical disk, anything configured to store program instructions, including ROM, RAM, flash memory, etc. In addition, examples of other media include app stores that distribute applications, sites that supply or distribute other various software, and recording media or storage media managed by servers.

Although embodiments have been described according to limited embodiments and drawings as above, various modifications and modifications are possible from the above description to those of ordinary skill in the art. For example, appropriate results may be achieved if the described techniques are performed in a different order from the described methods, and/or components such as systems, structures, devices, and circuits are combined or combined in a different form from the described methods.

Thus, other implementations, other embodiments, and those equivalent to the claims also fall within the scope of the claims to be described later.

What is claimed is:

1. A first user equipment (UE) comprising:
a memory comprising a universal integrated circuit card (UICC);
a transceiver to transmit and receive a wireless signal; and
a processor connected to the memory and the transceiver, wherein the processor is configured to:
determine to perform communication through a sidelink on an unlicensed band with a second UE while the first UE is in a state which is out of coverage of a base station,
based on the determination, identify pre-configuration information used for the unlicensed band and stored in the UICC,
obtain a priority threshold value for the sidelink on the unlicensed band from the pre-configuration information,
determine, based on the priority threshold value, whether to transmit data through the sidelink on the unlicensed band with the second UE,
identify data to be transmitted to the second UE through the sidelink on the unlicensed band,
identify priority of the data,
identify whether the priority of the data is less than the priority threshold value,
based on the priority of the data being less than the priority threshold value, wait for transmitting the data to transmit other data distinct from the data, and
after completing transmission of the other data, transmit the data to the second UE through the sidelink on the unlicensed band.

2. The first UE according to claim 1, wherein the processor is configured to:
based on the priority of the data being greater than or equal to the priority threshold value, transmit the data through the sidelink on the unlicensed band with the second UE.

3. The first UE according to claim 1, wherein the processor is further configured to:
perform resource sensing during a sensing window, and
determine, based on the sensing, at least one resource to transmit the data on the unlicensed band.

4. The first UE according to claim 3, wherein the pre-configuration information further includes effective probability information, and
wherein the processor is further configured to determine, based on the effective probability information, whether to maintain the at least one resource.

5. The first UE according to claim 4, wherein the processor is further configured to transmit the data through the at least one resource.

6. The first UE according to claim 1, wherein the unlicensed band includes 5.9 GHz band.

7. A method for operating a first user equipment (UE) in wireless communication system, the method comprising:
determining to perform communication through a sidelink on an unlicensed band with a second UE while the first UE is in a state which is out of coverage of a base station,
based on the determination, identifying pre-configuration information stored in a universal integrated circuit card (UICC) comprised in memory of the first UE,
obtaining a priority threshold value for the sidelink on the unlicensed band from the pre-configuration information,
determining, based on the priority threshold value, whether to transmit data through the sidelink on the unlicensed band with the second UE,
identifying data to be transmitted to the second UE through the sidelink on the unlicensed band,
identifying priority of the data,
identifying whether the priority of the data is less than the priority threshold value,
based on the priority of the data being less than the priority threshold value, waiting for transmitting the data to transmit other data distinct from the data, and
after completing transmission of the other data, transmitting the data to the second UE through the sidelink on the unlicensed band.

8. The method according to claim 7, further comprising:
based on the priority of the data being greater than or equal to the priority threshold value, transmitting the data through the sidelink on the unlicensed band with the second UE.

9. The method according to claim 7, further comprising:
performing resource sensing during a sensing window, and
determining, based on the sensing, at least one resource to transmit the data on the unlicensed band.

10. The method according to claim 9, wherein the pre-configuration information further includes effective probability information, and
wherein the method further comprises determining, based on the effective probability information, whether to maintain the at least one resource.

11. The method according to claim 10, further comprising transmitting the data through the at least one resource.

12. The method according to claim 7, wherein the unlicensed band includes 5.9 GHz band.

* * * * *